(12) United States Patent
Pellew et al.

(10) Patent No.: US 9,742,475 B2
(45) Date of Patent: Aug. 22, 2017

(54) PROXIMITY BEACON

(71) Applicant: Sensor Labs Limited, London (GB)

(72) Inventors: Edward Pellew, London (GB); William Neep, London (GB)

(73) Assignee: Sensor Labs Limited, London (GB)

( * ) Notice: Subject to any disclaimer, the term of this patent is extended or adjusted under 35 U.S.C. 154(b) by 0 days.

(21) Appl. No.: 15/171,569

(22) Filed: Jun. 2, 2016

(65) Prior Publication Data
US 2016/0359526 A1     Dec. 8, 2016

(51) Int. Cl.
| | |
|---|---|
| *H04B 5/00* | (2006.01) |
| *G01B 7/00* | (2006.01) |
| *G01B 7/02* | (2006.01) |
| *G01S 11/06* | (2006.01) |
| *H04B 17/318* | (2015.01) |
| *G06F 1/16* | (2006.01) |

(52) U.S. Cl.
CPC ........... *H04B 5/0075* (2013.01); *G01B 7/003* (2013.01); *G01B 7/023* (2013.01); *G01S 11/06* (2013.01); *G06F 1/1694* (2013.01); *H04B 17/318* (2015.01)

(58) Field of Classification Search
CPC ............................ H04B 5/0075; H04B 17/318
USPC ......................................................... 455/41.1
See application file for complete search history.

(56) References Cited

U.S. PATENT DOCUMENTS

| | | | | |
|---|---|---|---|---|
| 2012/0284427 A1* | 11/2012 | Dods | ..................... | H04W 88/00 710/3 |
| 2013/0106697 A1* | 5/2013 | Kulik | ..................... | G01C 17/38 345/158 |
| 2013/0293416 A1* | 11/2013 | Waters | ..................... | G01S 19/48 342/357.31 |
| 2014/0111380 A1* | 4/2014 | Gibbs | ..................... | G01S 5/02 342/451 |
| 2014/0141796 A1* | 5/2014 | Marti | ..................... | G01S 5/0252 455/456.1 |

(Continued)

FOREIGN PATENT DOCUMENTS

| | | |
|---|---|---|
| DE | 102012007286 A1 | 10/2013 |
| GB | 2516563 A | 1/2015 |

(Continued)

OTHER PUBLICATIONS

Intellectual Property Office, Combined Search and Examination Report under Sections 17 and 18(3) for GB1509628.2, mailed Sep. 11, 2015.

(Continued)

*Primary Examiner* — April G Gonzales

(74) *Attorney, Agent, or Firm* — Honigman Miller Schwartz and Cohn LLP; Matthew H. Szalach; Jonathan P. O'Brien

(57) ABSTRACT

A system and method are provided in which a radio-frequency channel is used in combination with a second validation channel to verify the proximity of two devices to each other. An RF channel is used to detect whether two devices are within a first, larger distance from one another and to enable communication between the two devices, whilst a second, validation channel is used to accurately verify that the two devices are within second, smaller distance from one another. In some embodiments, the second verification channel is a magnetic channel.

20 Claims, 16 Drawing Sheets

(56) References Cited

U.S. PATENT DOCUMENTS

| | | | | |
|---|---|---|---|---|
| 2014/0141803 A1* | 5/2014 | Marti | ............... | H04W 4/043 |
| | | | | 455/456.2 |
| 2014/0156180 A1* | 6/2014 | Marti | ............... | G01S 5/0252 |
| | | | | 701/423 |
| 2014/0171098 A1* | 6/2014 | Marti | ............... | G01S 5/0252 |
| | | | | 455/456.1 |
| 2014/0171114 A1* | 6/2014 | Marti | ............... | G01C 21/10 |
| | | | | 455/456.2 |
| 2014/0171118 A1* | 6/2014 | Marti | ............... | G01S 5/0252 |
| | | | | 455/456.3 |

FOREIGN PATENT DOCUMENTS

| | | |
|---|---|---|
| WO | WO-2013022877 A1 | 2/2013 |
| WO | WO-2014128703 A1 | 8/2014 |

OTHER PUBLICATIONS

Intellectual Property Office, Search Report under Section 17(6) for GB1509628.2, mailed Dec. 1, 2015.
Intellectual Property Office, Examination Report under Section 18(3) for GB1509628.2, mailed Nov. 30, 2015.
Intellectual Property Office, Combined Search and Examination Report under Sections 17 and 18(3) for GB1519252.9, mailed Nov. 30, 2015.
European Patent Office, Extended European Search Report for EP Application No. 16172455.4, mailed Nov. 4, 2016.

* cited by examiner

PROXIMITY BEACON

CROSS REFERENCE TO RELATED APPLICATIONS

This application claims the benefit of priority to GB Patent Application No. 1509628.2, filed on Jun. 3, 2015 and to GB Patent Application No. 1519252.9, filed on Oct. 30, 2015, the disclosures of which are incorporated herein by reference in their entirety.

FIELD OF THE INVENTION

This invention relates to systems and methods for registering when two devices are brought into close proximity of one another.

BACKGROUND TO THE INVENTION

Current approaches to measuring the proximity of two devices, such as a mobile phone and a radio beacon, use received signal strength indications (RSSI). The power of a RF signal received at a particular mobile device from a RF beacon is measured. The higher the received signal, the higher the RSSI value and the closer the device is considered to be from the beacon. Mobile devices are polled by the beacon using a unique identifier, which can be used by a mobile device to determine the beacon from which the signal was transmitted and, using the signal strength, the proximity of that beacon relative to the mobile device.

Whilst RSSI provides an approximation of distance of a mobile device from a RF beacon, these measurements are not accurate enough for many applications. For example, in "touch" interactions, where a mobile device is brought into very close proximity of a "touch" terminal, a proximity measurement accurate to less than 1 cm is desirable. Such accuracy cannot be obtained by RSSI measurements, which are highly dependent on noise due to multipath propagation and diffraction interference. Additionally, RSSI sensitivity depends on the sensor chip used and its mounting location in a particular mobile device. Thus, an RSSI measured at a set distance from a sensor will vary from device to device. A further disadvantage of using RSSI in "touch" applications is that the sampling rate of RSSI chips is typically in the region of 1-2 Hz. Since a touch action is usually completed within a two second duration, anomalous readings are hard to guard against without taking more readings for longer, which itself sacrifices user experience.

There is therefore a need for improved techniques for measuring the relative distance between two devices in close proximity, particularly for applications in "touch" technology.

In U.S. Pat. No. 8,683,707, a magnetically modulated location system is described which uses a multiple-dipole magnetic transmitter transmitting on distinct frequencies. The relative angle of the receiver in a single plane can then be ascertained with a two-dipole transmitter.

In PCT Patent Application WO 2014/128703 A1 (Wise-Sec Ltd), an RF signal and a magnetic field are used in order to determine the distance between a mobile device and a target device. Wise-Sec Ltd defines that the detection of an RF signal meeting a certain criterion triggers the device to search for a magnetic field.

Similarly, in German Patent Application DE 10 2012 007 286 A1 (Dahmouni) discloses a device in which detection of an RF signal triggers a device to search for a magnetic field in order to validate the occurrence of an event.

SUMMARY OF THE INVENTION

According to a first aspect of the present invention, there is provided a device, comprising: a radio-frequency (RF) receiver configured to receive an RF signal from a second device; a magnetometer configured to detect a magnetic field generated by the second device, a processor configured to: a) determine a value of a property of the received RF signal, and determine whether the value of the property of the RF signal satisfies at least a first criterion; b) determine a value of a property of the magnetic field at the first device, and determine whether the value of the property of the magnetic field satisfies at least a second criterion; and c) register a touch event on determining that the value of the property of the received RF signal satisfies the first criterion and that the value of the property of the magnetic field satisfies the second criterion, wherein the processor is further configured to run processes a) and b) concurrently.

The use of concurrent RF signal and magnetic field detection means that the present invention is less likely to validate false positive touch events. For example, in Wise-Sec Ltd, the RF criterion may be met and subsequently unmet before a magnetic field criterion is met, creating a false positive touch event.

The property of the magnetic field is preferably magnetic field strength. The processor may be configured to high pass filter the detected magnetic field in order to remove any DC offset arising from decalibration of the device. The determination of whether the magnetic field strength satisfies the second criterion may comprise determining whether the magnetic field strength exceeds a first threshold. As such, as the device is brought into proximity of the second device and the strength of the field experienced by the device increases above the first threshold a touch is registered.

An ambient magnetic field strength may be determined by averaging a plurality of magnetic field strength readings over time. The processor may be configured to ignore magnetic field strength readings over an upper threshold value when determining the ambient magnetic field strength. The determination of whether the magnetic field strength satisfies the second criterion may comprise determining whether the difference between the magnetic field strength and the ambient magnetic field strength exceeds a threshold.

The determination of whether the magnetic field strength exceeds the first threshold may comprise determining the distance between the first device and the second device based on the measured magnetic field strength, since field strength from a magnet is proportional to the distance from the dipole of the magnet.

Preferably, the processor is further configured to calibrate the measured magnetic field strength by averaging a plurality of measurements of magnetic field strength over a period of time.

When determining whether the value of the property of the magnetic field satisfies at least a second criterion the processor may generate a magnetic field footprint by performing a Fourier transform on the detected magnetic field correlating the magnetic field footprint with one or more template footprints; and verifying a match between the magnetic field footprint and one of the template footprints based on the correlation. The correlation may be performed using a matched filter. The correlation may comprise comparing the magnetic field footprint with a conjugated time-reversed version of each of the one or more template footprints.

The device may further comprise a gyroscope, and the processor may determine a pitch and/or roll event of the device by monitoring outputs of the gyroscope. During determining of that value of the property of magnetic field satisfies the second criteria, the processor may ignore magnetic readings satisfying the second criteria during the pitch and/or roll event. Thus false positives associated with pitch and roll of the device, as opposed to bringing the device down into contact with a touch terminal, can be avoided.

Alternatively, the measuring of the magnetic field strength may comprise taking multiple measurements over a time period and the determination of whether the magnetic field strength satisfies the second criterion may comprise calculating a rate of change of magnetic field over the time period and determining whether the rate of change of magnetic field exceeds a threshold. By using a rate of change measurement, the calibration of the magnetometer does not affect the result of the calculation.

In some embodiments, the property is a received signal strength indication (RSSI). Determining whether the value of the property satisfies the first criterion may comprise calculating a value of received signal strength. In some embodiments, the first criterion is that the value of received signal strength exceeds a signal strength threshold. Since different devices in practice may be more or less sensitive to received signals, the value of the received signal strength may be normalised based on a characteristic of the device, such as make or model.

The processor may be further configured to low pass filter the calculated value of received signal strength before determining whether the value of the received signal strength exceeds the signal strength threshold. Alternately, an adaptive filter may be used such as a Least Mean Square (LMS) adaptive filter.

The device may further comprise an accelerometer. In which case, registration of a touch event may be further dependent on a change in acceleration of the first device measured by the accelerometer. In some embodiments, the change of acceleration comprises a change in direction of acceleration. As such the act of moving the device towards and subsequently away from the second device may cause a touch event to be registered. Alternatively or additionally, the registration of a touch event is dependent on a determination by an accelerometer that the device has been stationary for a predetermined period of time. Further, the registration of a touch event may be further dependent on a determination of a change in acceleration preceding the device being stationary for the predetermined period of time. Further, the processor may determine a pitch and/or roll event of the device by monitoring outputs of the accelerometer; and during determining of that value of the property of magnetic field satisfies the second criteria, ignore magnetic readings satisfying the second criteria during the pitch and/or roll event.

The processor may be further configured to extract a unique identifier from the received RF signal, the unique identifier identifying the second device.

In some embodiments, the proximity beacon as described above with reference to the first aspect of the present invention.

According to a second aspect of the invention, there is provided a method of validating the proximity of a first device from a second device, the method comprising, at the first device: a) receiving a RF signal from the second device, determining a value of a property of the received RF signal, and determining whether the value of the property of the RF signal satisfies a first criterion; b) determining a value of a property of the magnetic field at the first device, and determining whether the value of the property of the magnetic field satisfies a second criterion; and c) registering a touch event in dependence on determining that the value of the property of the received RF signal satisfies the first criterion and that the value of the property of the magnetic field satisfies the second criterion, wherein method steps a) and b) are performed concurrently.

Preferably, the property of the magnetic field is magnetic field strength. In some embodiments, the determination of whether the magnetic field strength satisfies the second criterion comprises determining whether the magnetic field strength exceeds a first threshold. The determination of whether the magnetic field strength exceeds the first threshold may comprise determining the distance between the first device and the second device based on the measured magnetic field strength.

The method may further comprise calibrating the measured magnetic field strength by averaging a plurality of measurements of magnetic field strength over a period of time.

Additionally or alternatively, the measuring of the magnetic field strength may comprise taking multiple measurements over a time period and/or the determination of whether the magnetic field strength satisfies the second criterion may comprise calculating a rate of change of magnetic field over the time period and determining whether the rate of change of magnetic field exceeds a threshold.

The property may be a received signal strength indication (RSSI). In which case, the first criterion may be that the received signal strength exceeds a signal strength threshold. The calculated value of received signal strength may be low pass filtered before determining whether the value of the received signal strength exceeds the signal strength threshold.

Registration of a touch event may further dependent on a change in acceleration of the first device or the second device. The change of acceleration may comprise a change in direction of acceleration.

The registration of a touch event may be further dependent on a determination, using an accelerometer, that the first device has been stationary for a predetermined period of time. Additionally or alternatively, registration of a touch event is dependent on a determination, using an accelerometer, that the second device has been stationary for a predetermined period of time.

Additionally or alternatively, the registration of a touch event may be dependent on a determination using the accelerometer, of a change in acceleration preceding the first device or the second device being stationary for the predetermined period of time.

According to a third aspect of the invention, there is provided a device, comprising: a) means for receiving an RF signal; means for determining a value of a property of the received RF signal; means for determining whether the value of the property of the RF signal satisfies a first criterion; b) means for determining a value of a property of the magnetic field at the device; means for determining whether the value of the property of the magnetic field satisfies a second criterion; and c) means for registering a touch on determining that the value of the property of the received RF signal satisfies the first criterion and the value of the property of the magnetic field satisfies the second criterion, wherein means a) and b) are configured to run concurrently.

The property of the magnetic field is preferably magnetic field strength.

According to a fourth aspect of the invention, there is provided a system for registering a touch event in which a first device is brought within a threshold distance of a second device, the system comprising: a first device; a second device; circuitry arranged to determine a first distance between the first device and the second device and to determine that the first distance is less than the threshold distance; circuitry arranged to validate the touch event, wherein the circuitry arranged to determine the distance between the first device and the second device comprises circuitry arranged to communicate between the first device and the second device over a radio-frequency (RF) channel and for determining that the distance is less than the threshold distance, wherein the circuitry arranged to validate the touch event comprises one or more sensors configured to detect a change in magnetic field around the first device or the second device, wherein the circuitry arranged to determine a first distance and the circuitry arranged to validate the touch event run concurrently.

In some embodiments, the circuitry arranged to communicate between the first device and the second device comprises a RF transmitter disposed in either of the first device and the second device and a RF receiver disposed in other of the first device and the second device.

The RF transmitter and RF receiver are configured to transmit using a Bluetooth® or WiFi® communication protocol. As such, the RF transmitter may be an iBeacon®.

In some embodiments, the circuitry arranged to determine the distance between the first device and the second device comprises one or more global positioning system (GPS) modules for locating the first device relative to the second device.

In some embodiments, the circuitry arranged to validate the touch event comprises a magnet disposed in either of the first device and the second device and a magnetometer disposed in other of the first device and the second device, the validation comprising determining a second distance between the first and second device in dependence of a value of a property of the magnetic field registered by the magnetometer and determining that the second distance is less than the threshold distance. Preferably, the second distance is less than the first distance.

Alternatively, the circuitry arranged to validate the touch event comprises a magnet disposed in either of the first device and the second device and a magnetometer disposed in other of the first device and the second device, the validation comprising calculating a rate of change of magnetic field registered by the magnetometer and determining that the rate of change exceeds a threshold.

In some embodiments, the change in external conditions is a change in acceleration of the first device or the second device. The change in acceleration of the first device of the second device may comprise a change in direction of acceleration. Preferably, the circuitry arranged to validate the touch event comprises an accelerometer disposed in the first device or the second device.

The touch event may be validated when the accelerometer registers a sudden change in acceleration or wherein the touch event is validated when the accelerometer registers a period substantially zero acceleration.

BRIEF DESCRIPTION OF THE DRAWINGS

Embodiments of the present invention will now be described, by non-limiting example only, with reference to the accompanying drawings, in which.

DESCRIPTION OF EMBODIMENTS OF THE INVENTION

The present invention aims to circumvent the problems associated with measuring distances using RSSI by combining RF measurements with a secondary validation mechanism. The benefit of RF is that it can be used to transfer complex data such as unique identifiers and the like, and register that two devices are reasonably proximal to one another. However, in order to provide the accuracy required to validate the proximity within, for example, 5 cm or less, embodiments of the present invention utilise a validation mechanism.

Accordingly, as described in more detail below, a system is provided in which radio-frequency channel is used in combination with a second validation channel to verify the proximity of two devices to each other. An RF channel is used to detect whether two devices are within a first, larger distance from one another and to enable communication between the two devices, whilst a second, validation channel is used to accurately verify that the two devices are within second, smaller distance from one another.

In some embodiments, this validation mechanism takes the form of a magnetic field measurement. A proximity sensor is provided on a first device and a magnet on the other. In operation, an RF transmitter located on one device and an RF receiver located on the other provide a relatively rough estimate of distance between the two devices, for example in the form of an RSSI value. Once the devices are within a threshold distance from one another, a very accurate determination of proximity of the mobile devices can be ascertained using the integrated magnetometer on the first device to measure the strength of the field created by the magnet integrated into the second device. Such accuracy is due to the fact that magnetic fields of a single dipole are extremely stable and only influence objects in a relatively short range. The result is a system having a magnetic "gate". The magnetic field strength in the close vicinity of the second device and generated by the magnet increases exponentially from the dipole and any magnetic activity measured by the magnetometer, assuming a corresponding strong RSSI value is detected, will dictate that the first and second devices are very close together, i.e. within a few centimeters.

The above described method, compared to standalone RSSI proximity measurement, provides a far more accurate measure of immediate proximity, due to the predictable nature of magnetic fields, whilst maintaining a resilient communication channel for more complex information using RF (e.g. radio-frequency identification (RFID)). Additionally, since most modern mobile devices (telephones, tablets etc.) include an integrated magnetometer, such as an anisotropic magnetoresistive (AMR) sensor, embodiments of the present invention can be implemented using mobile devices currently on the market.

Figure 1:
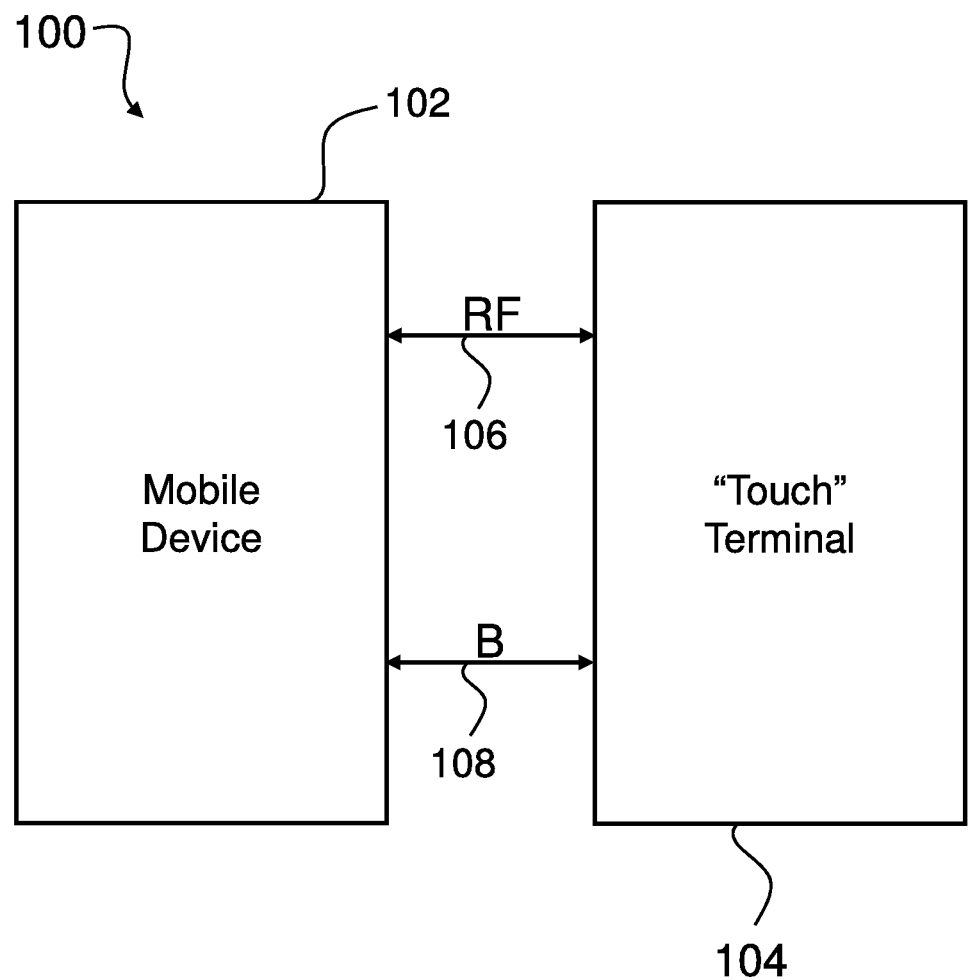
FIG. 1 is a schematic diagram of a system according to an embodiment of the present invention.

An overview of a system 100 according to an embodiment of the present invention will now be described with reference to FIG. 1. The system 100 comprises a mobile device 102 and the "touch" terminal 104. As the mobile device 102 and terminal 104 are brought into close proximity with one another, two communication channels 106, 108 are formed therebetween. A RF channel 106 provides medium range communication between the mobile device 102 and the terminal 104, and a magnetic channel 108 provides relatively short range communication (e.g. touch validation). It is noted that the term communication is used broadly, i.e. in the sense that a magnet communicates with a magnetometer by adjusting its mechanical or resistive properties. It is also noted that the direction of flow of signals (RF and magnetic) between the mobile device and reader is not important, so long as both RF and magnetic channels 106, 108 exist between the two devices 102 and 104 during a touch event. Accordingly, each of the mobile device 104 and the terminal 106 may include a RF transmitter and/or a RF receiver. Equally, each of the mobile device 104 and the terminal 106 may include a magnetometer and/or a magnet for generating a magnetic field.

Figure 2:
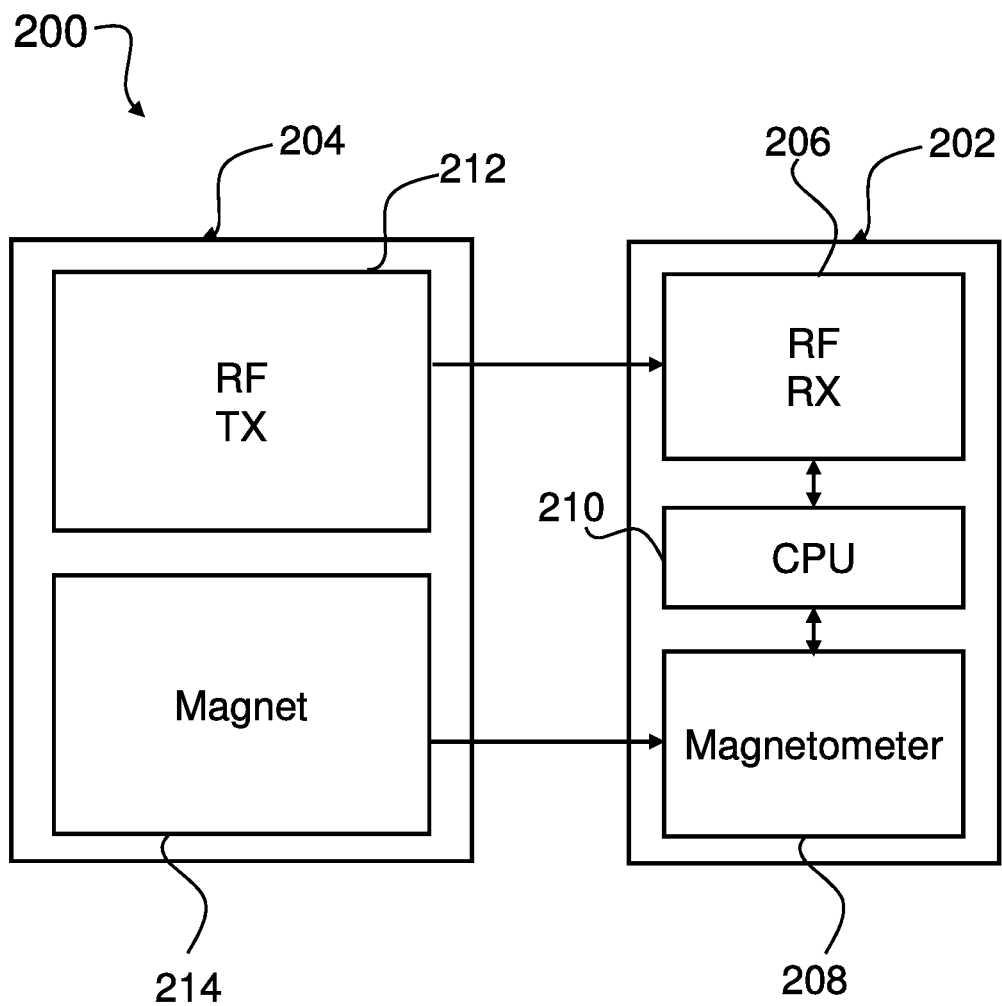
FIG. 2 is a schematic diagram of a system according to an embodiment of the present invention.

FIG. 2 is a detailed schematic illustration of a system according to a further embodiment of the present invention. The system 200 comprises a mobile device 202 and a "touch" terminal 204. The mobile device 202 is in some embodiments a mobile telephone or tablet and comprises a radio frequency (RF) receiver 206, such as a Bluetooth® or WiFi® receiver or a cellular (e.g. 3G) transceiver, together with a magnetometer 208. The mobile device 202 will also comprise a processor 210 operable to process signals generated by the RF receiver 206 and/or the magnetometer 208. In some embodiments, processing hardware may be implemented in the receiver 206 and/or the magnetometer 208 instead of the provision of a separate processor 210 as shown in FIG. 2. The terminal 204 comprises a RF transmitter 212 in combination with a magnet 214.

The receiver 206 and transmitter 212 may use any suitable wireless transmission protocol to transmit data between the mobile device 202 and the touch terminal 204. Preferably, a wireless standard is used for RF transmission between the mobile device 202 and the terminal 204, such as Bluetooth® or WiFi®.

As mentioned above, the respective locations of the receiver 212 and transmitter 206 in the terminal 204 and device 202 is not essential to the proper working of the system. However, it will be appreciated that many mobile devices, such as mobile phones, already contain a RF transceiver such as a Bluetooth® or WiFi® chip whereas the terminal 204 is a likely to be bespoke device manufactured for applications of embodiments of the present invention. Accordingly, in order to reduce cost, and potentially power consumption of the "touch" terminal, in the embodiment shown in FIG. 2 the reader 204 comprises the RF transmitter 212 and the magnet 214. As such, the reader 204 only needs to transmit information relating to its identity together with a magnetic field and need not include any additional hardware for receiving and processing data. In other words, the reader 204 shown in FIG. 2 acts as a beacon for both RF signals and magnetic fields and requires no further intelligence in order for the system 200 to operate.

Operation of the system shown in FIG. 2 shall now be described with reference to FIG. 3 which shows a flow diagram 300 of the process performed at the terminal 204 for communication to the mobile device 202. At step 302, the touch reader 204 transmits a RF signal including a unique identifier which is unique to the particular touch terminal 204. At the same time, at step 304, the touch terminal 204 emits magnetic radiation from the magnet 214. The magnet 214 may be a permanent magnet. Alternatively, the magnet may be an electromagnet emitting a magnetic field with a strength which can be controlled by a voltage applied to the electromagnet. In which case, the touch terminal 204 may be calibrated to emit a magnetic field having a predetermined strength. As discussed above, because the terminal 204 is arranged only to emit RF and magnetic radiation, no further processing need take place at the touch terminal 204.Referring now to FIG. 4, a flow diagram 400 is shown which describes the operation at the mobile device 202. At step 402, the RF receiver scans for RF signals. At step 404, on detection of a valid RF signal in range of the mobile device, the mobile device 202 extracts the unique identifier contained in the received RF signals (step 406). Before or after step 406, the received signal strength of the RF signal is determined (step 408) using any known technique. The unique identifier and the raw RSSI data are then output to the processor 210 at step 410 for further processing.

Figure 4:
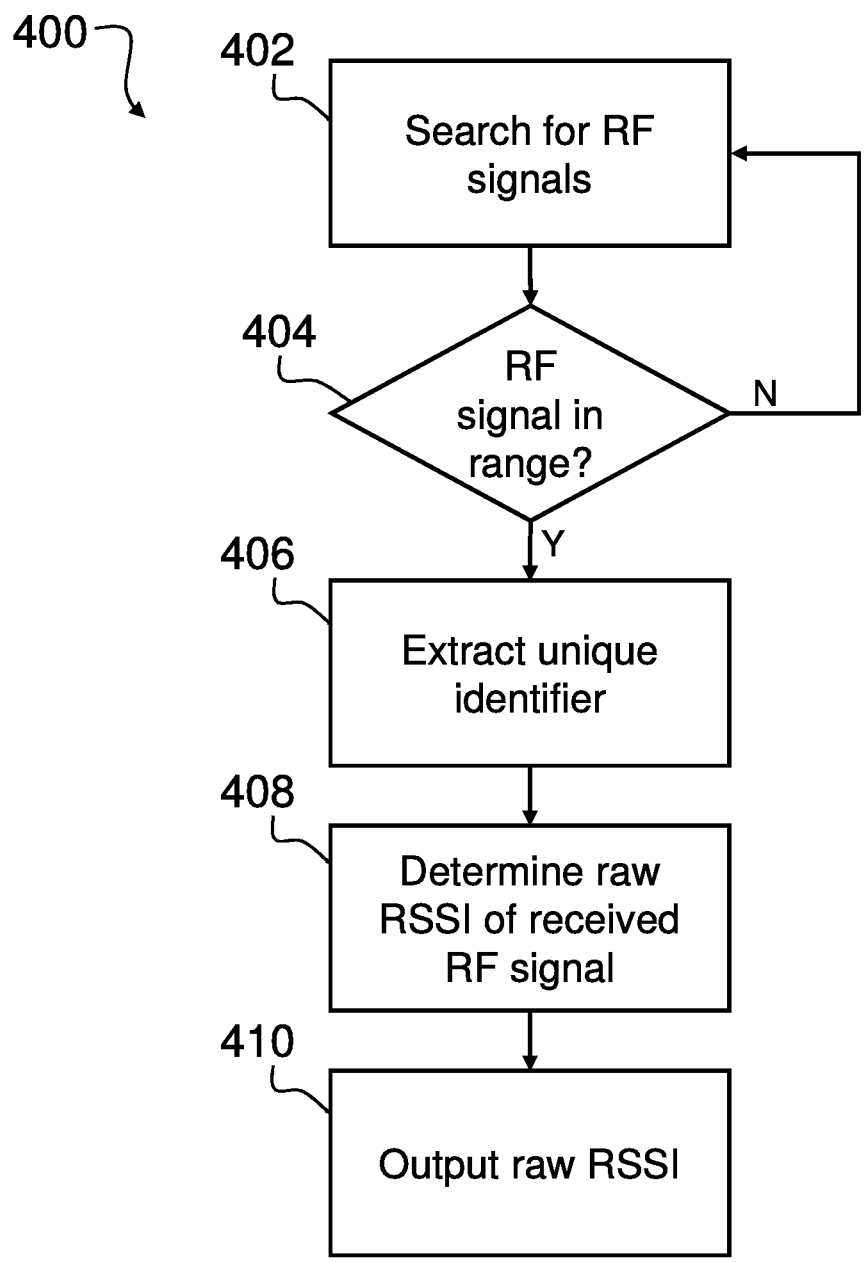
FIG. 4 is a flow diagram describing a process performed by a mobile device according to an embodiment of the present invention.
Figure 5:
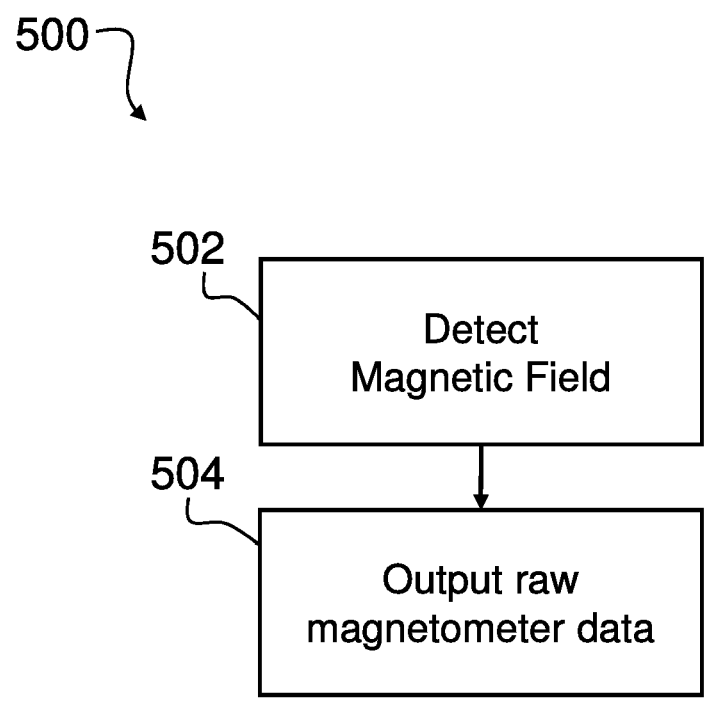
FIG. 5 is a flow diagram describing a further process performed by a mobile device according to an embodiment of the present invention.

At the same time as the processes shown in FIG. 4, referring to the flow diagram 500 in FIG. 5, the magnetometer 208 of the mobile device 202 is arranged, at step 502, to detect magnetic fields in the vicinity of the mobile device 202 and output raw magnetometer data in the form of magnetic field strength to the processor 210 (step 204).

Figure 3:
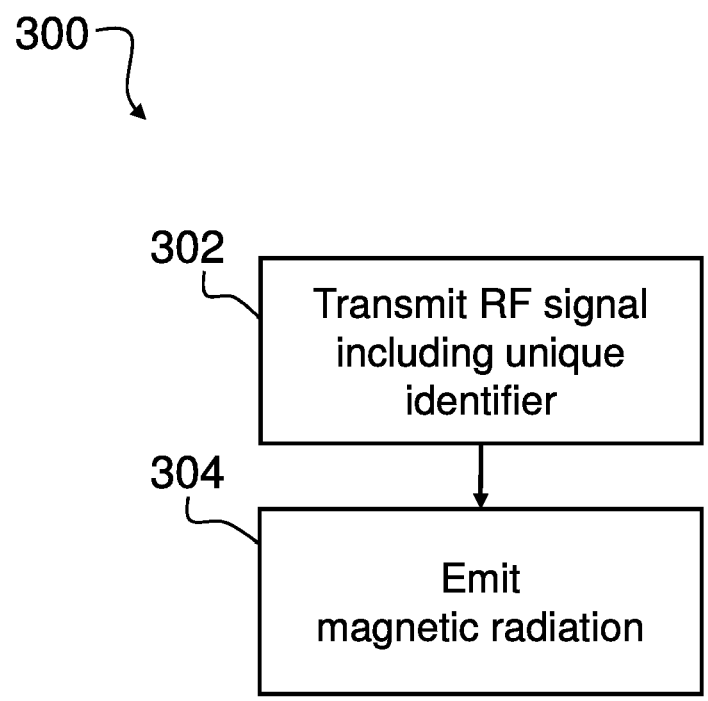
FIG. 3 is a flow diagram describing a process performed by a proximity beacon according to an embodiment of the present invention.

It will be appreciated that the processes described with reference to FIGS. 3 to 5 are preferably performed simultaneously and continuously such that, as the mobile device 202 comes into RF range and then magnetic range of the touch terminal 204, all of the data required to register a touch event is available to the processor 210.

Figure 6A:
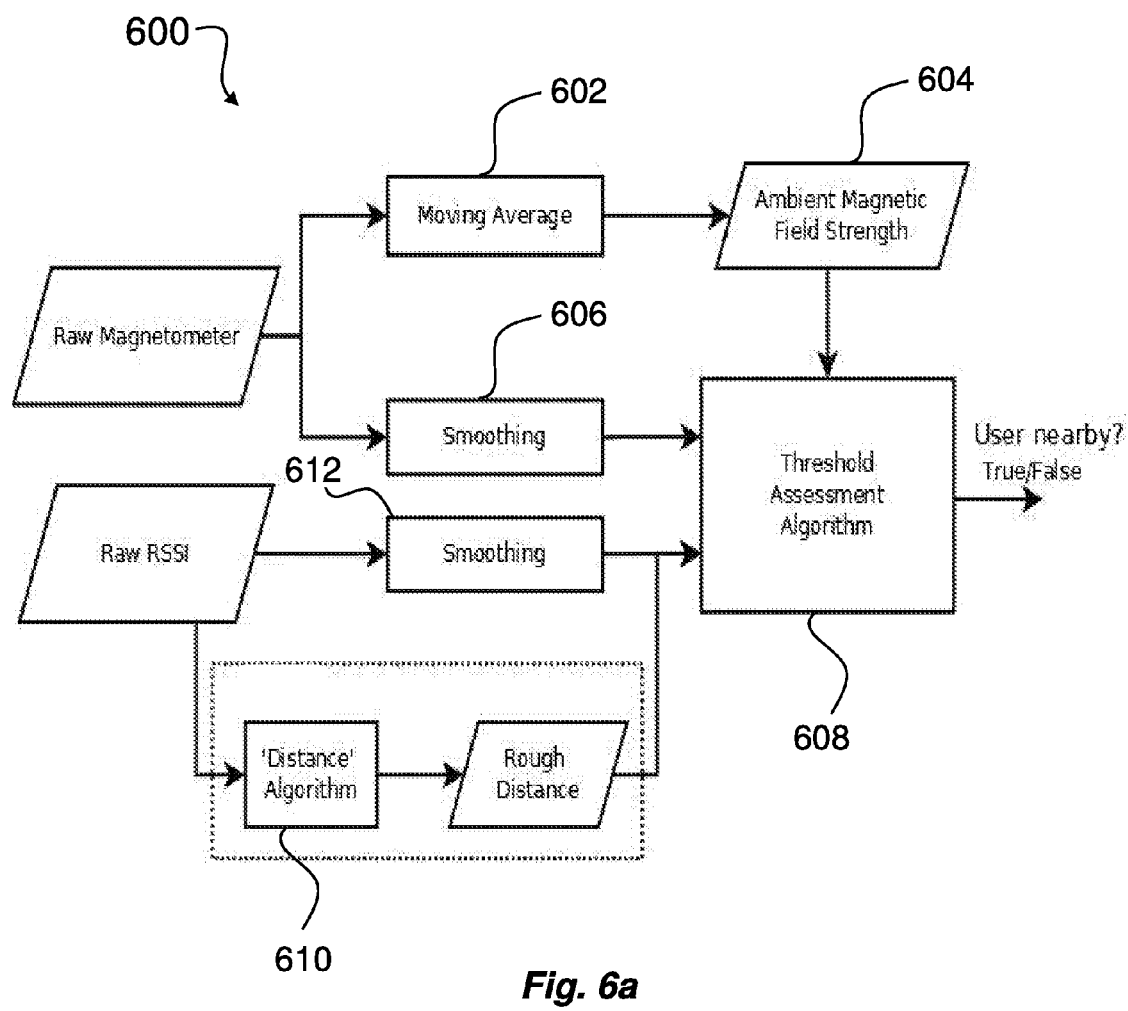
FIG. 6a is a flow diagram describing a process for processing raw magnetometer and RSSI data according to an embodiment of the present invention.

The flow diagram 600 of FIG. 6 illustrates the process performed by the processor 210 on the mobile device 202. Raw magnetometer data received from the magnetometer 208 is filtered, at step 602, using a moving average filter to generate a value of ambient magnetic field strength. Such filtering may involve receiving raw data from the magnetometer 208 over an extended period of time and generating an average over that period, thus providing a base level ambient magnetic field strength. Based on this measure of ambient magnetic field strength, short term changes in magnetic field can be measured, i.e. encounters of the mobile device 202 with strong magnets such as that located within the touch terminal 204. The ambient magnetic field strength 604, calculated by the moving average filter at step 602, is then provided to a threshold assessment algorithm 608 which will be described in more detail below. The measure of ambient magnetic field using the moving average filter may be based on all magnetic field readings over time. However, in some circumstances, these magnetic field readings may include readings when a magnet is in close proximity to the device 202. Such readings are likely to skew the ambient field readings if the field experience in proximity to the magnet far exceeds that of the earth's magnetic field. To avoid this skew, at step 602, readings which are significantly higher than expected may be discounted. For example, readings which lie above a particular threshold could be ignored when calculating the ambient field strength. Additionally or alternatively, readings which trigger a touch event could be ignored. In other words, readings that are clearly above normal background magnetic field levels, are preferably ignored when calculating estimated ambient magnetic field strength.

In addition to generating an ambient magnetic field, the raw magnetometer data is also smoothed at step 606 using, for example, a moving average filter or other generic low pass filter. This filtering step flattens any sudden anomalous peaks in magnetic field measured by the magnetometer which might detrimentally affect the validation of a touch event. Accordingly, the resultant filtered signal from step 606 is also provided to the threshold assessment algorithm 608 for further processing.

It will be appreciated that any known low pass filtering technique could be used to filter the raw magnetometer data. As an alternative to low pass filtering, an adaptive filter, such as a Least Mean Square (LMS) adaptive filter, could be used to filter either the raw magnetometer data or already low pass filtered magnetometer data. In which case, a feedback loop may be provided to determine if the change in magnetic field strength is significant enough to represent a touch in event. Additionally, instead or in combination with generating an ambient magnetic field strength value and a smoothed value as described above, the rate of change of the magnetic field $\Delta B$ could be calculated and subsequently filtered to smooth our any anomalies, a relatively fast increase in magnetic field representing the movement the mobile device 202 towards the touch terminal 204, i.e. a touch in event.

During the process 600 shown in FIG. 6, raw RSSI data received from the RF transceiver 206 is also processed. A distance algorithm (step 610) may generate a measure of distance in dependence of the signal strength received at the receiver 206. This measure of distance referred to in FIG. 6 as a "rough distance" value, is provided to the threshold assessment algorithm 608 for processing. Additionally or alternatively the raw RSSI data is smoothed at step 612 using any suitable smoothing filter or algorithm (e.g. moving average filter) and the smoothed raw RSSI data is provided to the threshold assessment algorithm 608. It will be appreciated that in the absence of steps 610 and the use of the distance algorithm to generate a rough distance for the threshold assessment algorithm 608, this calculation may be performed by the threshold assessment algorithm 608 itself.

It will be appreciated that wireless sensors present on mobile devices such as mobile phone handsets, are not standardized. For example, a Samsung Galaxy S3 ® placed 10 cm away from a Bluetooth® radio transmitter will sense an RSSI of −13 dBm whereas a Sony Xperia Z1 ® in the same position and same distance from the same transmitter will sense an RSSI reading of −45 dBm. Due to such large differences in response between devices, employing a single magnitude threshold for all devices may lead to systematic error for proximity gating depending on the mobile device being used with the touch reader 204. Additionally, different handset operating systems operate with different RSSI polling rates. For example, Apple® devices running iOS® poll for RSSI at a rate of 1 Hz, whereas Android® uses a polling rate of 2 Hz. Such discrepancies may lead to inconsistency in RSSI readings and thus a non-ideal user experience.

To attend to the above device discrepancy issues, the system 200 may incorporate a calibration library which allows each handset by brand and/or model to be adjusted to normalize the results of RSSI data. Such a calibration library may be stored locally or remote from the device 202, and may be accessed by the distance algorithm at step 610.

Figure 6B:
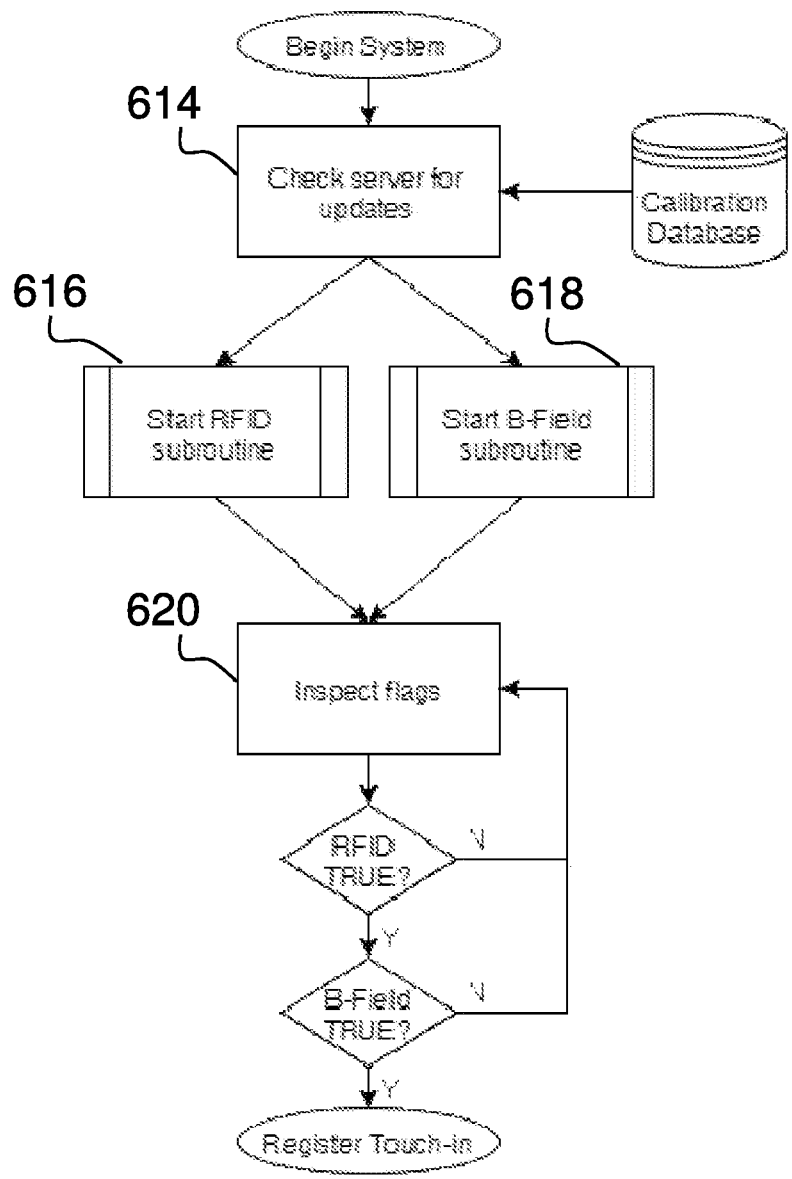
FIG. 6b is a flow diagram describing a process for processing raw magnetometer and RSSI data according to an embodiment of the present invention.

FIG. 6b is a flow diagram which further illustrates the process 600 for registering a touch event. At step 614, a calibration database is checked for any updates and to calibrated sensor values etc. Concurrently the RF and B-field subroutines 616, 618 are started (described in more detail below). Flags output from each of these subroutines are then inspected at step 620 and if both flags signify positive RF and B-field events, a touch-in is registered.

Starting the RF and B-field subroutines concurrently aids in the avoidance of false positive validation of touch events. Prior art systems rely on a value of a criterion of the RF signal to reach a threshold before the B-field subroutine is started. In this manner, false positive validations may occur, for example, if the RF signal threshold is met and subsequently unmet before a B -field criterion threshold is met.

In the present embodiment, the RF and B-field concurrent subroutines avoid false positive validations. Both criteria must meet the threshold at the same time for a touch event to be validated. If the RF threshold is met and subsequently unmet before a B-field threshold is met, a false positive touch event will not be validated.

In one example, the RF and B-field subroutines are started concurrently. At a later time, the RF criterion and the B-field criterion simultaneously meet their respective thresholds in order to validate a touch event. As such, a touch event is validated.

In another example, the RF and B-field subroutines are started concurrently, as above. At a first time, the RF threshold is met, but the B-field threshold is not met. At a later time, the RF threshold is still at the same value and the B-field meets the threshold. As both thresholds have been met at the same time, a touch event is validated. Alternatively, the B-field threshold may be met before the RF threshold is met. In essence, a touch event is validated as long as both thresholds are determined to be met at a common time. This is different from the prior art arrangements, which require that the RF threshold be met first of all, before the B field subroutine even begins to start searching for a B field of sufficient strength to meet the B field threshold. However, in the prior art, after the B field subroutine has started after the RF threshold has been met, it is possible for the RF threshold to subsequently drop below the threshold, but the B field measurement to then be subsequently met. Such a situation would yield a false positive result, but which result is not possible with the arrangement of the present embodiment, where both the RF threshold and the B field thresholds must be met at the same time.

Figure 7:
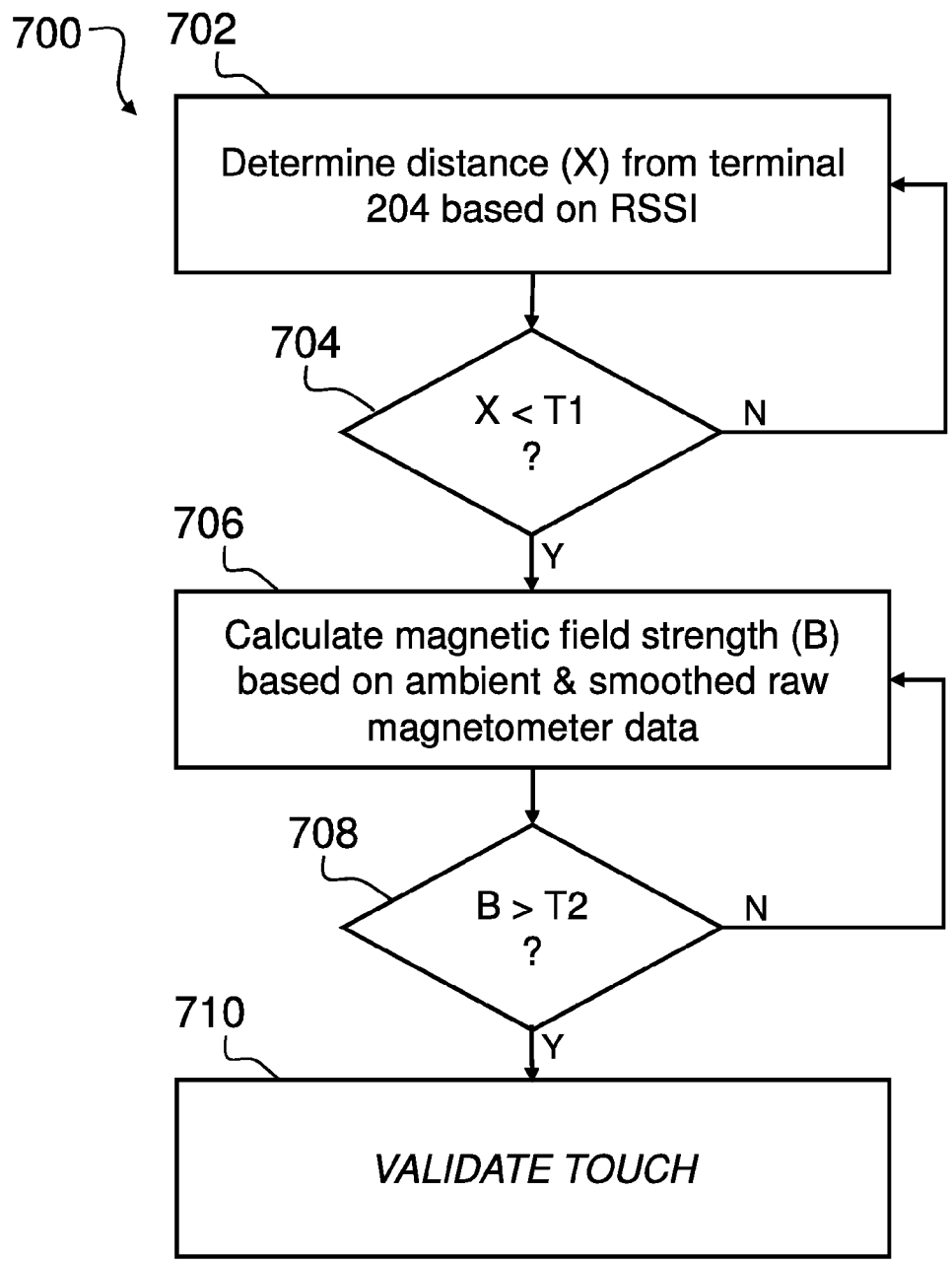
FIG. 7 is a flow diagram describing a process for processing processed magnetometer and RSSI data according to an embodiment of the present invention.

The flow diagram in FIG. 7 illustrates a process performed by a threshold assessment algorithm 608 in accordance with one embodiment for determining whether or not a valid touch event has taken place between the mobile device 202 and the touch terminal 204. At step 702, the distance between the mobile device 202 and the touch terminal 204 is determined based on the RSSI. As mentioned above, this measurement may be performed separately using a distance algorithm as shown out step 610 of FIG. 6. Alternatively, however, the threshold assessment algorithm 608 itself may determine the distance value x. In a further alternative embodiment, the distance x is not calculated and, instead, the RSSI is used for the subsequence step 704 to determine whether a threshold condition has been met. In other words, the step of calculating a distance value x is skipped.

Referring again to FIG. 7, at step 704, the determined distance x is compared with a threshold distance T1 and if the calculated distance x between the mobile device 202 and the touch terminal 204 is found to be less the threshold T1, the process moves on to step 706. Otherwise, the algorithm continues to monitor the received RSSI data until the required conditions are met.

At step 706, the magnetic fields strength (B) is calculated based on the ambient magnetic field strength and the smoothed raw magnetometer data generated at steps 602 and 606 of FIG. 6 respectively. This calculation may be performed in any known manner For example and most simply, the calculated ambient magnetic field strength may be subtracted from the smoothed magnetometer data which was generated at step 606. A situation may arise, however, in which as the mobile device 202 is brought into close proximity of the touch terminal 204, the magnetic field generated by the magnet 214 causes the magnetometer 208 to become de-calibrated. Effectively, the zero point of the magnetometer 208 is altered by the magnetic field, causing a systematic error. Whilst the magnetometer 208 could be recalibrated, this would be detrimental to a user's experience of the system 200. Accordingly, the magnetic field strength may be calculated using an adaptive filter such that a comparison is always being made between a real ambient field strength and an input field strength. In one embodiment implementing adaptive filter, such as a Least Mean Square (LMS) adaptive filter, the output signal is fed back to an adaptive algorithm arranged to filter out the DC state of the bias offset error. This is particularly beneficial in the circumstance where the mobile device 202 is brought down into the vicinity of the touch terminal 204 and held there for a period of time, during which the magnetic field experienced by the mobile device 202 is relatively high for an extended period of time, which may be confused as an offset error. Using an adaptive filter, the algorithm could be tuned to respond in a desirable manner in such circumstances.

It will be appreciated that due to the effect of the earth's magnetic field, when the mobile device 202 is tilted, magnetic field strength recorded by the magnetometer 208 may vary. This can cause a touch event to be registered accidentally, for example, in circumstances in which the mobile device 202 is tilted in the vicinity of the terminal 204. Such offset angle artefacts can be accounted for in several different ways. For instance, the increase in magnetic field experienced when bringing the mobile device 202 into contact with the terminal 204 has a different footprint to the field footprint of tilting the device 202. Accordingly, by performing a Fourier transform on recorded magnetic field during a typical touch event, the frequency domain footprint of that event can be recorded. This touch-event template can then be used to verify subsequent touch events. For example, when a potential touch event is registered, the magnetic footprint of the event can be correlated with the template. In some embodiments, this correlation is implemented using a matched filter or otherwise convolving a potential touch-in signal with a conjugated time-reversed version of the template signal.

Additionally or alternatively, the mobile device 202 may comprise an accelerometer (not shown). In which case, pitch and roll of the mobile device 202 may be estimated by tracking the acceleration vector caused by gravity in each of the accelerometer's axes. Then, when the mobile device 202 is being tilted, this tilting can be detected and associated magnetic artefacts can be filtered out.

In some situations, acceleration changes due to movement of the mobile device 202 may lead to a false reading of tilt of the device. Accordingly, additionally or as an alternative to use of the accelerometer, the mobile device 202 may comprise one or more gyroscopes (not shown) and the gyroscopes can be used to estimate when the device 202 is being rotated by measuring changes in angular velocity of the device 202. Thus, the resilience of the device 202 to false readings of tilt can be increased.

Referring again to FIG. 7, at step 708, the calculated calibrated magnetic field strength B may be compared with a predetermined threshold magnetic field strength T2 to determine whether or not the magnetic field strength is high enough and, as such, the mobile device 202 is close enough to the terminal 204 to validate a touch event in which the mobile device 202 is within a threshold distance from the touch terminal 204. If the condition is validated, i.e. the calculated calibrated magnetic field strength is greater than the threshold magnetic field strength, then the process moves to step 710. Otherwise, the algorithm 608 continues to calculate the calibrated magnetic field strength based on the input data from steps 602 and 606 shown in FIG. 6. At step 710, the threshold assessment algorithm 608 then outputs a validation signal confirming that a validated touch event has taken place between the mobile device 202 and the touch terminal 204.

Figure 8:
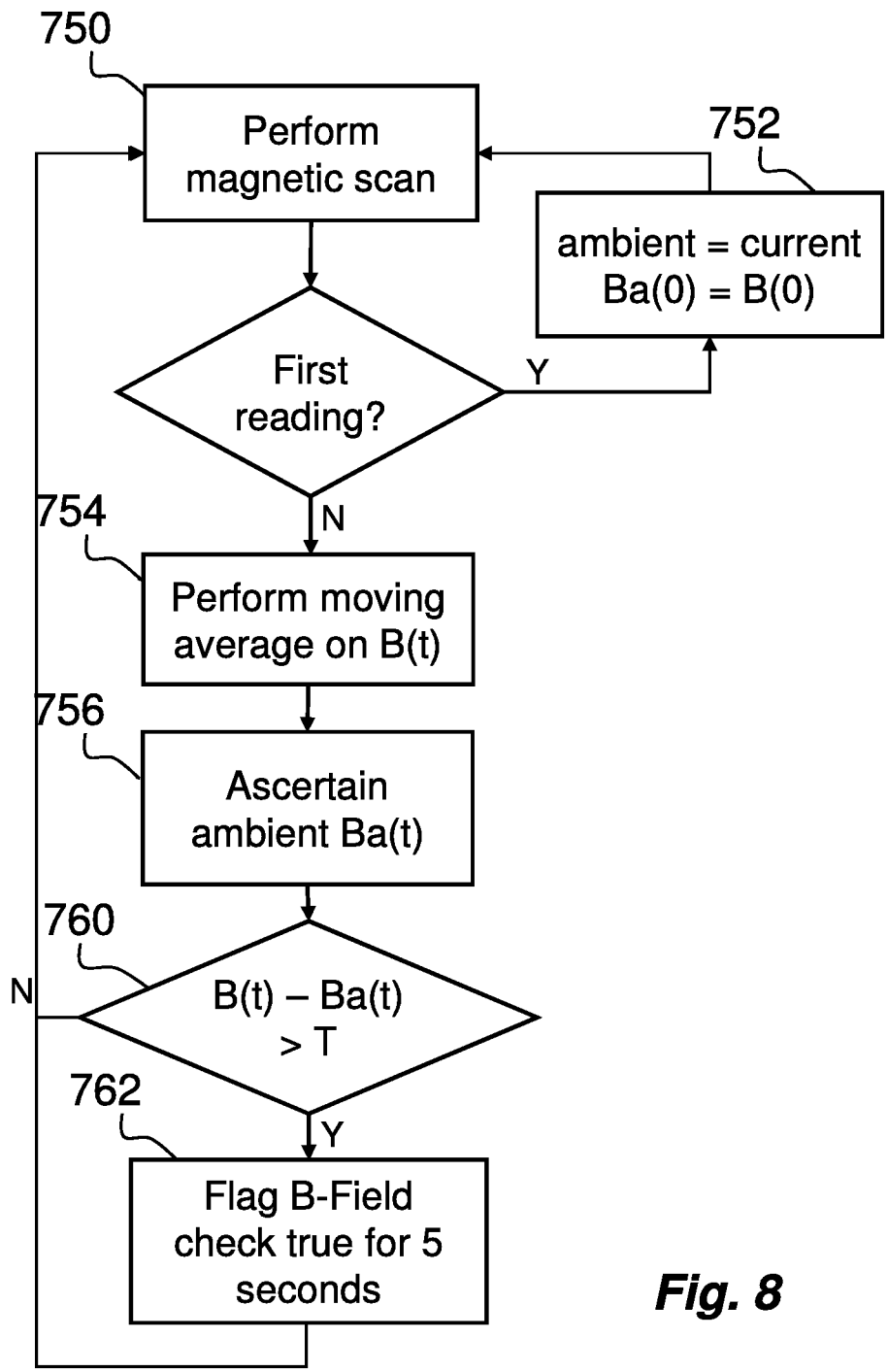
FIG. 8 is a flow diagram describing a process for processing magnetometer data according to an embodiment of the present invention.

Referring now to FIG. 8, a variation of the threshold assessment algorithm 608 of FIGS. 6 and 7 above, is described. The process begins at step 750 by performing a magnetic scan using the magnetometer 208. If the process is being run for the first time on the device 202, or no previous data concerning magnetic field strength has been stored, the current magnetic field strength reading is stored at step 752. If the process is not being run for the first time, at step 754 a moving average is performed on the basis of a plurality of measurements over time and an estimate of ambient magnetic field ascertained at step 756. The moving average filter typically has a relatively large window, thereby having the effect of low pass filtering any anomalous magnetic field spikes (caused by, e.g., a magnet in the proximity of the device). Such spikes should, therefore, only marginally affect the ambient field estimate. The use of a moving average allows the ambient value to drift and protects against systematic error from decalibration. The filter effectively tracks the DC offset caused by systematic error. Once an ambient magnetic field has been estimated, at step 758, the current magnetic field reading is compared with the ambient field value at 760, and if the difference between the current and ambient field values is greater than a threshold, for more than a preset time period, e.g. 5 seconds, a positive magnetic field event is flagged at step 762.

Figure 9:
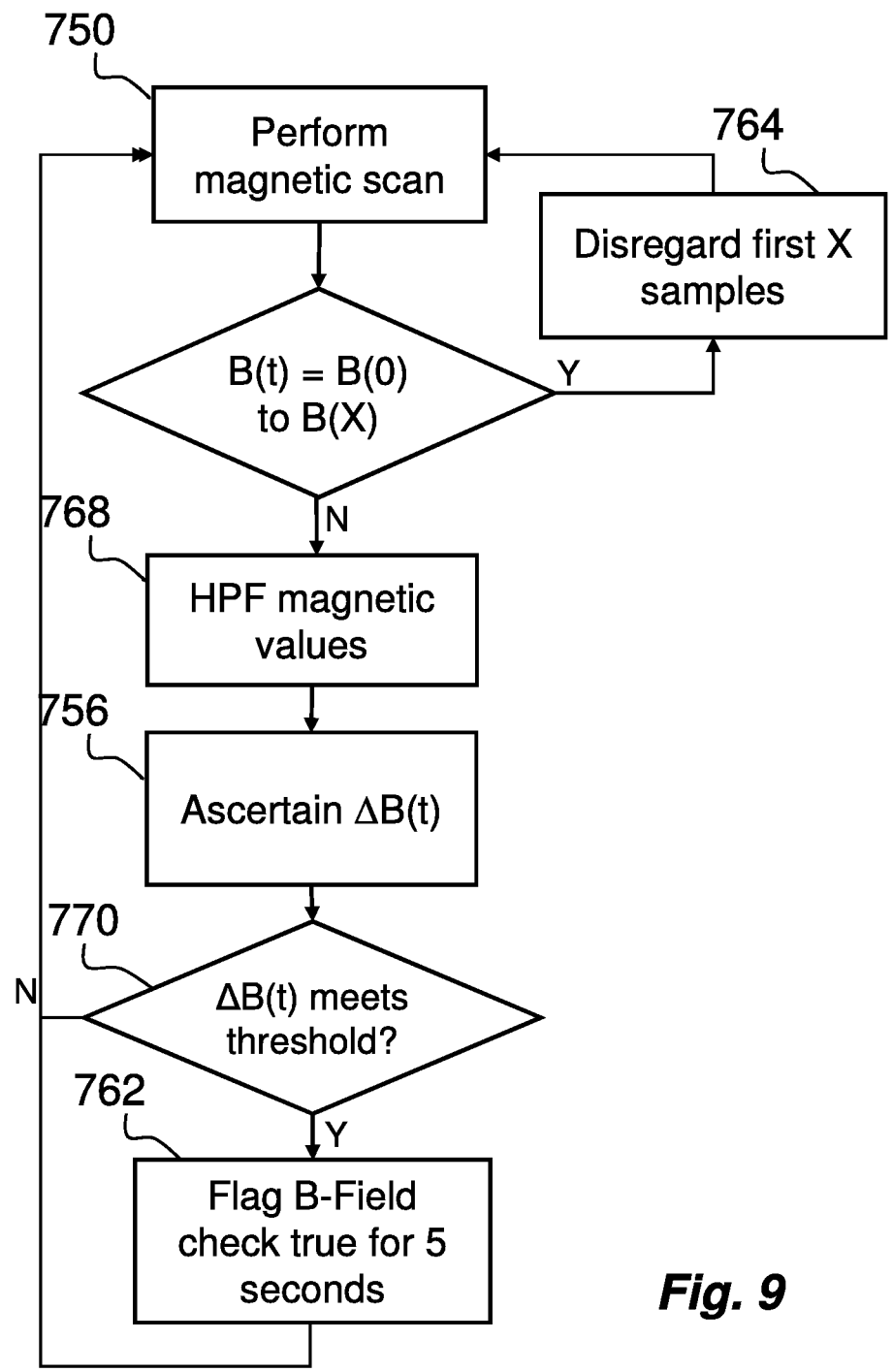
FIG. 9 is a flow diagram describing a process for processing magnetometer data according to an embodiment of the present invention.

Referring to FIG. 9, a further variation of a threshold assessment algorithm is described. Some of the steps referred to in FIG. 9 are equivalent to those shown in FIG. 8 and so have been provided with like numbering. The process begins at step 750 by performing a magnetic scan using the magnetometer 208. At step 764, a check is performed to see if the most recently recorded magnetic field strength is one of the first X values which have been measured from the start of the process. If this is the case, then at step 766 the signal is disregarded. Experimentation has found that magnetometers of some devices (e.g. Apple devices) are susceptible to significant sensor bounce, which leads to erroneous readings. Accordingly, by disregarding the first, e.g., 10 readings, any potentially erroneous signals are removed from any future calculations. If X or more readings have already been performed, then at step 768, instead of a moving average calculation as described with reference to FIG. 8, the measured magnetic field values are high pass filtered to remove any systematic error (e.g. DC offset) caused by magnetometer decalibration and at step 769 the actual (calibrated) magnetic field reading is ascertained. The resultant calibrated values are then compared against a threshold field level at step 770 and at step 762 a positive magnetic field even is flagged of the magnetic field value is above the threshold value for more than a preset time period, e.g. 5 seconds.

Embodiments described above with reference to FIGS. 1 and 2 utilize magnetic fields to determine interactions between a magnetometer and a magnet to accurately calculate distance between a terminal and a mobile device. Some state of the art smart phones comprise reed switches embedded into the frame of the phone which allows the phone to be locked when a magnet is presented, e.g. a magnetic phone cover. Accordingly, the strength of the magnetic field generated by the magnet 214 in the touch terminal 204 is preferably limited so as to avoid causing such handsets to go to sleep when the device is brought into close proximity of the terminal. Preferably, the magnetic field strength of the magnet is less than 2500 µT and more preferably less than 600 µT. Alternatively, instead of controlling the magnetic field strength, a smart phone may be configured such that when the process as described with reference to FIGS. 4 to 7 is running on the mobile device the device does not go to sleep when the reed switch on the device is switched by a strong magnetic field.

In addition, from mobile device to mobile device, positioning of magnetometers located therein varies. This results in large discrepancies in magnetic field strength reading between different devices. For example, if a magnetometer is located at the base of a given mobile handset, the distance between it and a touch reader 204 could be three to four times larger than if it were placed at the top of a handset (near the earpiece). Since magnetic field strength is proportional to the inverse cube of distance and further since the system is situated in the Earth's magnetic field having a strength of around 50 µT, this difference in distance could represent the difference been a registered and non-registered touch even. To minimize the effect of this magnetometer positioning discrepancy, the magnet is preferably located in the reader as far away from the top or outside of the reader as possible. Thus, the discrepancy between readings taken by a device with magnetometer in its base and a device with a magnetometer located at its top will be minimized This can be better visualised by imagining two extremes. If the magnet was located right at the peak of the touch landing zone, the magnetometer could either be between 0 cm and around 10 cm from the magnet (depending on its location in a device). If on the other hand the magnet was located a meter away from the touch landing zone for the mobile device, the magnetometer could be between 1.00 m to 1.01 m from the magnet. The strength of the magnet is chosen such that it is weak enough not to trigger any reed switches present in the mobile device, whilst still maintaining an adequate user experience.

In the embodiments described above, an RF communication channel is provided in combination with a magnetometer or magnetic communication channel for validation of a touch event. In an alternative embodiment, however, in addition to or instead of the magnetic channel, an accelerometer may be used to validate a touch event.

Figure 10:
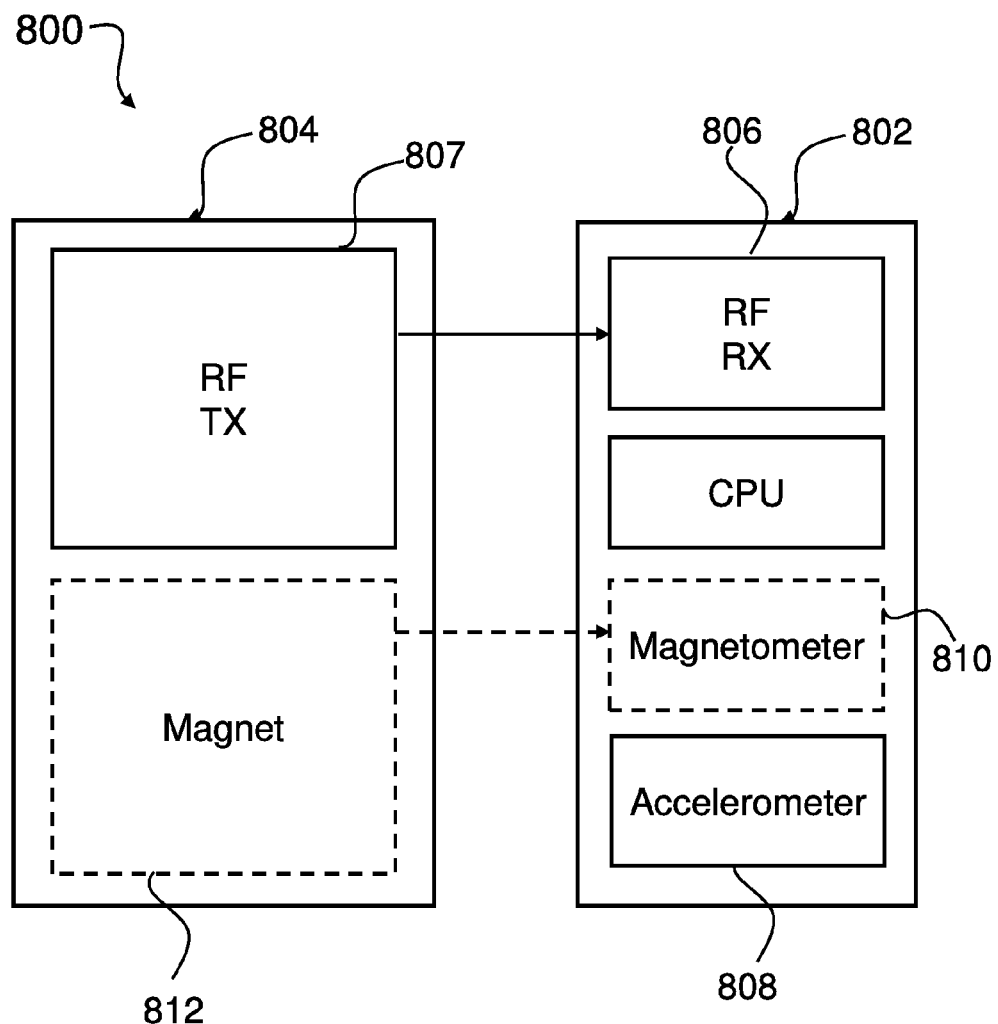
FIG. 10 is a schematic diagram of a system according to an embodiment of the present invention.

FIG. 10 shows the system in accordance with this embodiment of the present invention, comprising a mobile device 802 and a touch terminal 804. As with the embodiment described with reference to FIG. 2, the system 800 in FIG. 10 comprises a RF receiver 806 located in the mobile device 802 and a RF transmitter 807 disposed within the touch terminal 804. However, instead of using magnetometer data from the mobile device in combination with a magnet disposed the touch terminal, an accelerometer 808, disposed within the mobile device 802, is used to validate a touch. For example, when an RF signal is detected by the receiver 806 in the mobile device and a received signal strength is used to determine a rough distance between the mobile device 802 and touch terminal 804, once the distance between the mobile device 802 and the touch terminal 804 is determined to be less than the threshold e.g. T1, data generated by the accelerometer is used to determine whether or not a touch event has taken place. In some embodiments if the accelerometer detects that the mobile device 802 is stationary i.e. not moving from side to side or up or down, then the mobile device 802 may determine that the user is holding the mobile device 802 very close and stationary to the touch terminal 804. In other embodiments, determination of a change in direction of the mobile device 802, for example in a direction parallel to the gravitational field (up and down), then the mobile device 832 may determine that the user has brought the device 802 toward and into close proximity of the touch terminal 804 and abruptly removed the same device 802 from the touch terminal 804 in whatever direction he or she desires. It will be appreciated that other signatures of a touch event detected by the accelerometer may be used to validate a touch event additionally or alternatively to the above.

It will be appreciated that the system 800 may also include a magnetometer 810 in combination with a magnet 812 and that, if present, the accelerometer may be used in combination with magnetic field readings to validate a touch event.

Additionally or as an alternative to the magnetometer 810, magnet 812 and accelerometer 808, validation of a touch event may be performed using a light dependent resistor (LDR) integrated either into the mobile device 802 or the touch terminal 804. The LDR is arranged on either the device 802 or the terminal 804 such that as the mobile device 802 is brought into close proximity of the touch terminal 804, light falling on the surface of the LDR is reduced and the resistance of the LDR changes. This change in resistance can then be used to validate the touch event.

Figure 11:
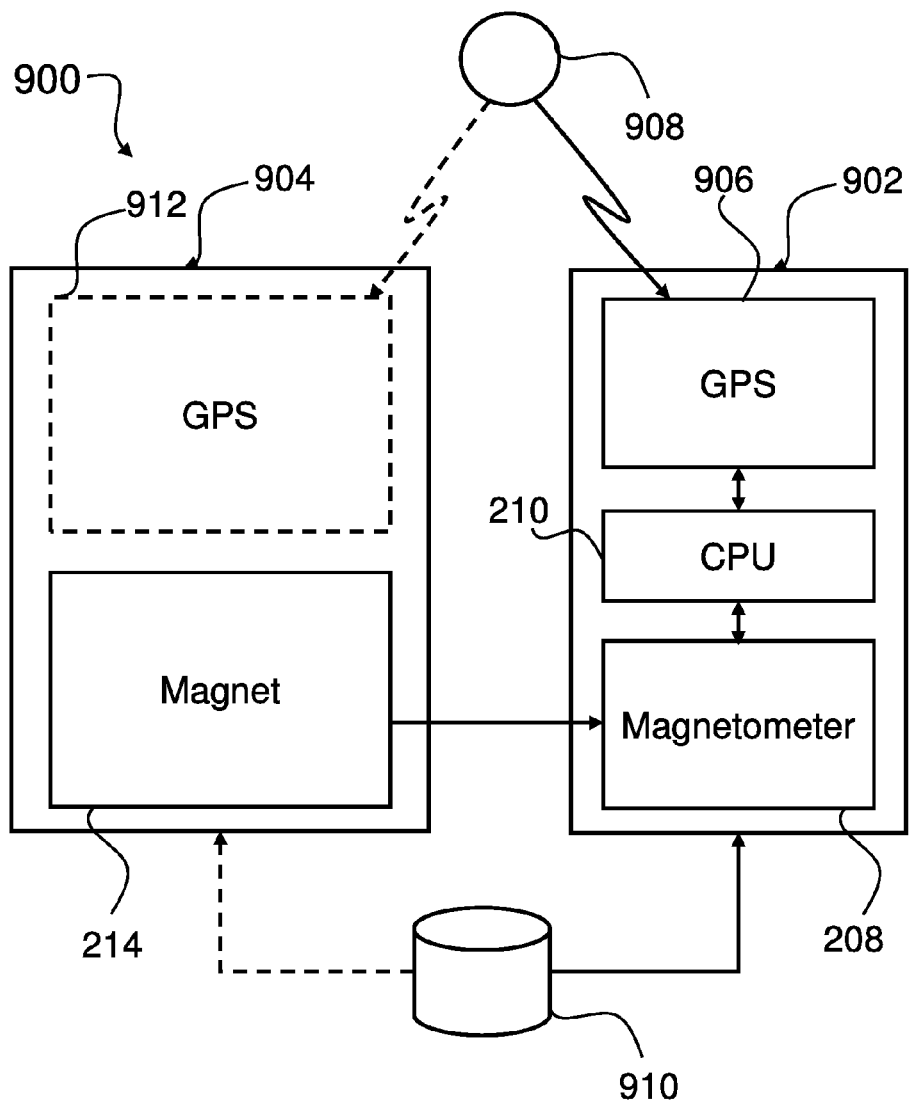
FIG. 11 is a schematic diagram of a system according to an embodiment of the present invention.

In a further alternative embodiment, instead of a direct RF channel between the mobile device 202 and the touch terminal 204, as shown in FIG. 4, GPS can be used to ascertain the approximate distance between the two devices. FIG. 11 is a schematic diagram of a system 900 modified from the system of FIG. 2, where like parts have been given like numbering. Optional features of the system 900 have been drawn using broken lines. The RF transceiver 206 and RF transmitter 212 of the embodiment of FIG. 2 have been replaced with a GPS module 906 in the mobile device 902 and, optionally, a GPS module 912 in the terminal 904. To determine its approximate location, the mobile device 902 uses the GPS module 906 communicating with a GPS network 908.

The location of the touch terminal 904 may also be determined. Alternatively, if the touch terminal 904 is a stationary object, the coordinates of the terminal 904 may be recorded at the time of installation. The recorded or measured location of the touch terminal 904 may then be stored in storage 910 located locally or remote to the mobile device 902 so as to enable access by the mobile device 902 of the location of the terminal 904 as well as other terminals-it will be appreciated that the mobile device 902 may be configured to interact with any number of terminals similar to the terminal 904 shown in FIG. 11. The process of validating a touch event between the terminal 904 and the mobile device 902 may then be similar to that described with reference to FIGS. 2 to 9 using the magnet 214 and magnetometer 208.

Instead of using GPS to locate the mobile device 902, the above description process may use cellular triangulation to generate an estimate of the location of the mobile device 902.

In both cases, in order for the mobile device 902 to ascertain the identity of the terminal 904, a database may be provided which links the terminals 904's coordinates with its unique identifier. Thus, when the location of the terminal 904 is transmitted to the mobile device 902, so too is its identity.

In the embodiments described above with reference to FIGS. 6 to 9 a decision is made to flag an RF or magnetic event based on a measurement of RF signal strength or magnetic signal strength exceeding a predetermined threshold. Even with extensive and accurate calibration of measured values (through normalisation etc.), having a binary pass/fail for an RF or magnetic gate could lead to false negatives, i.e. where a user cannot touch-in even though a large increase in RSSI has been measured because the increase in RSSI is just slightly below the gate threshold.

Accordingly, in some embodiments, instead of a simple binary pass/fail gate, a confidence rating can be generated based on one or more additional observations which can be used to help reduce both false negatives and false positives. For example, an observation can be made as to whether or not RSSI increases before or near the time of the magnetic field increase. Additionally or alternatively, measured tilt behaviour (from accelerometer or gyroscope data) can be used rule out false positives (as discussed above).

In one embodiment, several measured variables are checked and their value converted into a confidence rating representing the confidence that the event associated with the measured variable's value or change in value is a touch-in event. Measured variables may include RSSI, B-field strength, a change in RSSI, a change in B-field, accelerometer/gyroscope measurements of tilt etc.

Figure 12:
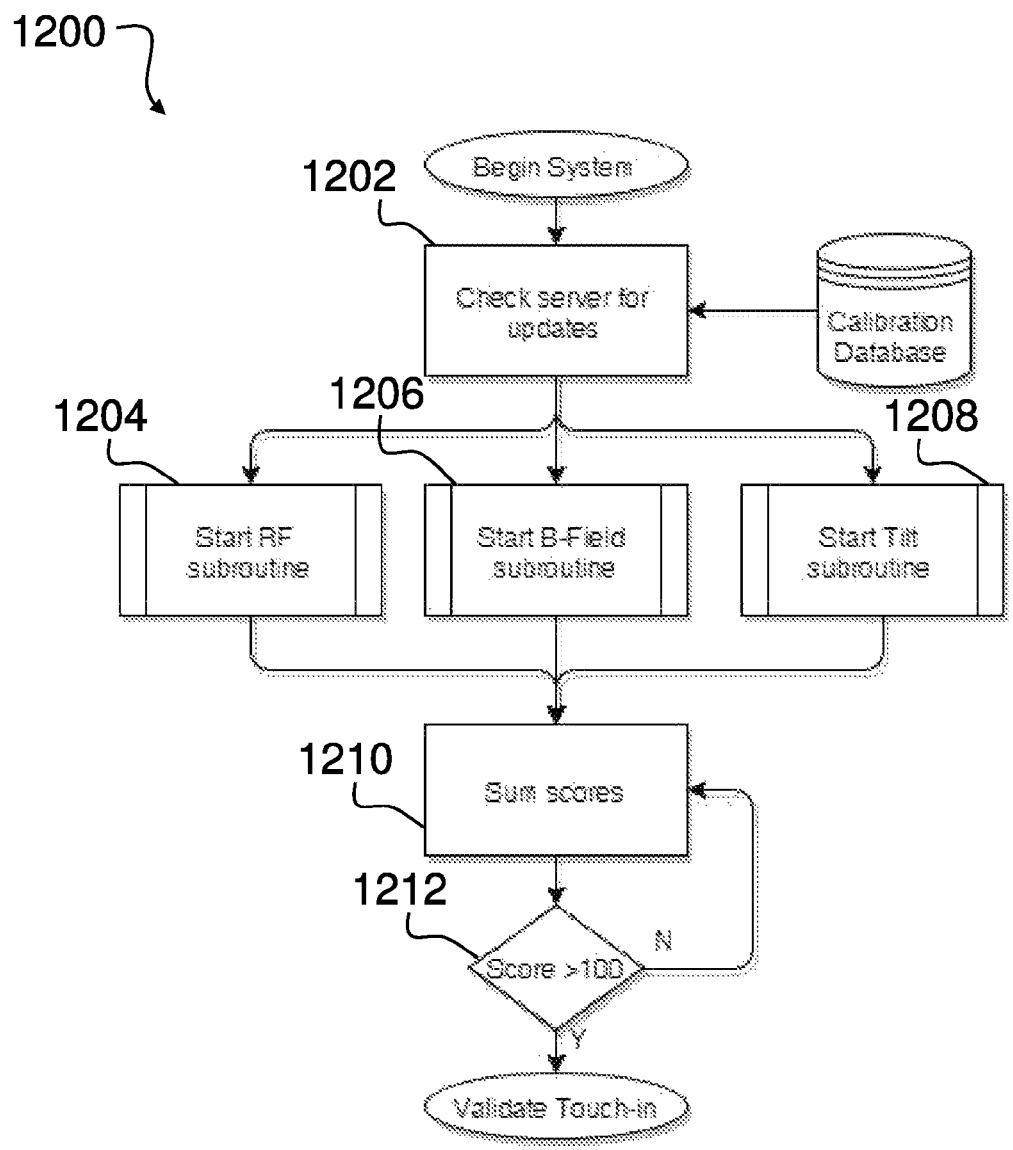
FIG. 12 is a flow diagram describing a process for processing magnetometer, RSSI and tilt data according to an embodiment of the present invention.

FIG. 12 is a flow diagram describing a process implementing a confidence rating system in accordance with an embodiment. As with FIG. 6b, at step 1202 a calibration database is checked for any updated calibration data for TF, B-field, tilt etc. Concurrent sub-routines for RF 1204, B-field 1206 and tilt 1206 are then started, each of which generate a confidence score pertaining to the likelihood that the associated the measurement of RF, B-field or tilt relates to a valid touch-in event. These scores are summed together at step 1210 and the sum is compared at step 1212 with a threshold score value (in this case 100). If the summed score exceeds the threshold score, a touch-in is registered.

Figure 13:
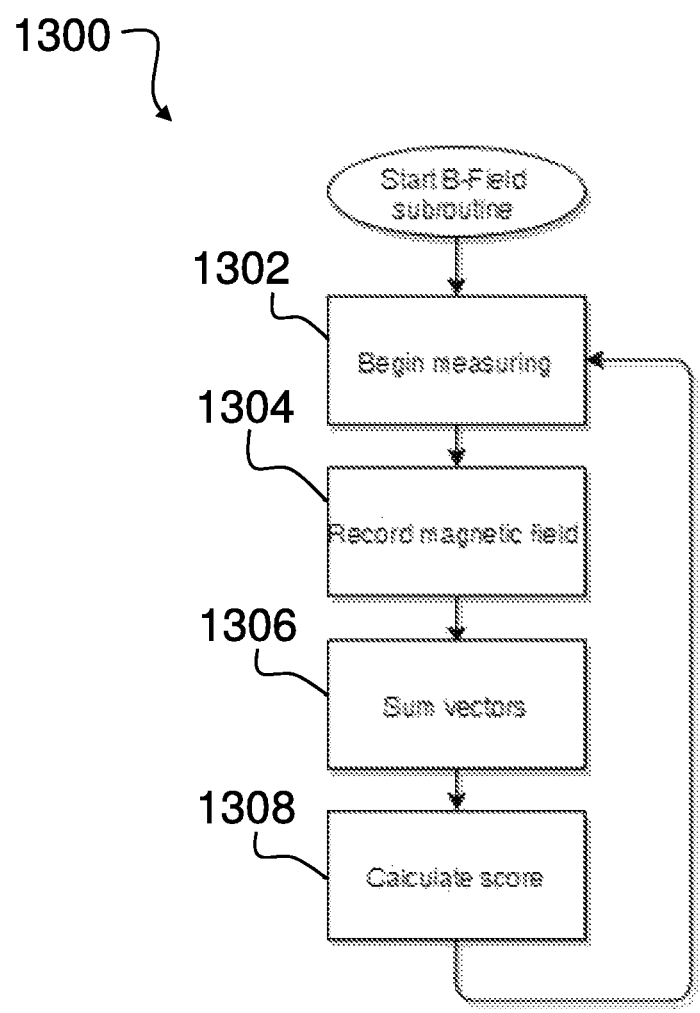
FIG. 13 is a flow diagram describing a process for magnetometer data according to an embodiment of the present invention.

FIG. 13 is a flow diagram of a sub-routine for generating B-field confidence scores. At step 1302, the B-field measurements begin and a magnetic field is recorded at step 1304. Vectors representing the difference between subsequent magnetic field readings are summer at step 1306 and a score is calculated at step 1308 based on this data, i.e. how quickly the magnetic field changes over subsequent field measurements.

Figure 14:
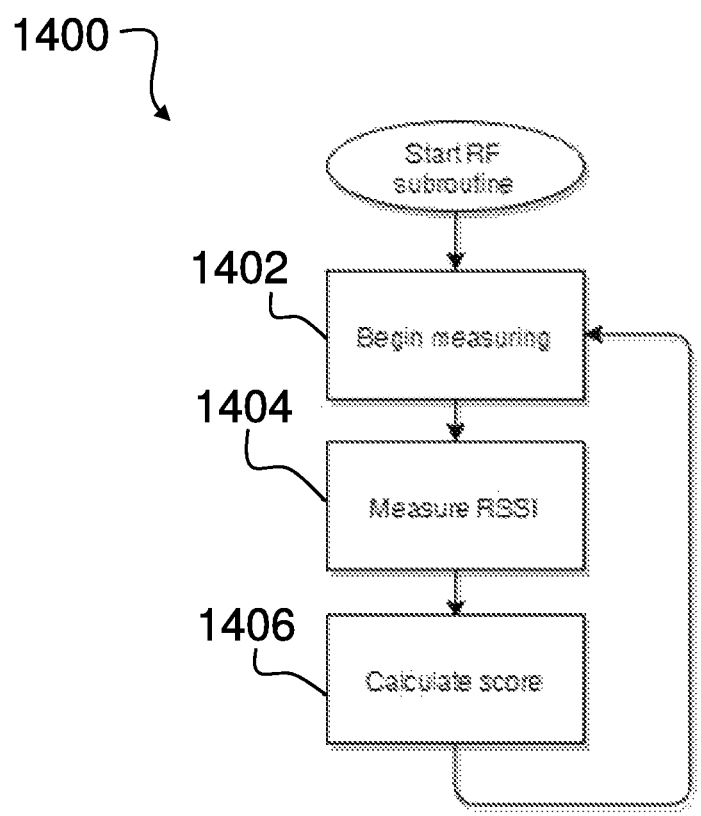
FIG. 14 is a flow diagram describing a process for processing RSSI data according to an embodiment of the present invention.

FIG. 14 is a flow diagram of a sub-routine for generating RF confidence scores. The process starts and at step 1402 signal strength measurements start to be taken. At step 1404 a measure of RSSI is acquired and at step 1406, based on the RSSI a confidence score is generated.

Figure 15:
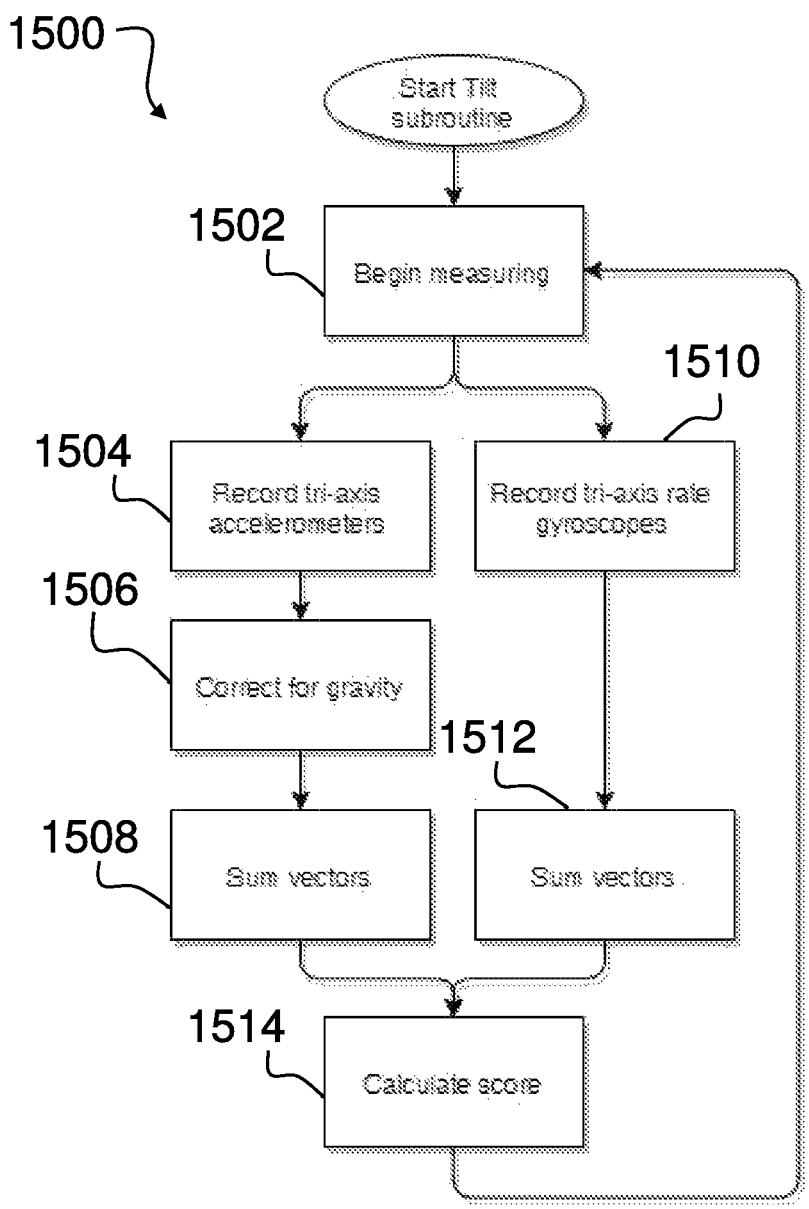
FIG. 15 is a flow diagram describing a process for processing tilt data according to an embodiment of the present invention.

FIG. 15 is a flow diagram of a sub-routine for generating tilt confidence scores, i.e. a score being a measure of how likely the measurements received from the gyroscope and/or accelerometer relate to a touch event rather than an accidental tilt of the mobile device 202. At step 1502, the process begins receiving data from tilt registering apparatus. FIG. 15 illustrates an example where both gyroscope and accelerometer data are used. I will be appreciated, however, that just one of these channels may be used for calculate the tilt confidence score. Using the accelerometer, at step 1504 tri-axis accelerometer values are recorded and corrected for gravitational influence at step 1506. Vectors representing changes in acceleration in three axes are then summed at step 1508. Using the gyroscope, at step 1510 gyroscope measurements are recorded and vectors representing changes in these values are summed at step 1512. Based on one or more of the summed accelerometer vectors (from step 1508) and the summed gyroscope vectors (from step 1510), a score representing the likelihood that the device 202 has been moved into a touch-in position rather than being accidentally tilted, is generated.

FEATURES OF THE INVENTION

1. A device, comprising:
    a radio-frequency (RF) receiver configured to receive an RF signal from a second device;
    a magnetometer configured to detect a magnetic field generated by the second device,
    a processor configured to:
        determine a value of a property of the received RF signal;
        determine whether the value of the property of the RF signal satisfies at least a first criterion;
        determine a value of a property of the magnetic field at the first device;
        determine whether the value of the property of the magnetic field satisfies at least a second criterion; and
        register a touch event on determining that the value of the property of the received RF signal satisfies the first criterion and that the value of the property of the magnetic field satisfies the second criterion.
2. The device of feature 1, wherein the property of the magnetic field is magnetic field strength.

3. The device of feature 2, wherein the processor is further configured to high pass filter the detected magnetic field.
4. The device of features 2 or 3, wherein the determination of whether the magnetic field strength satisfies the second criterion comprises determining whether the magnetic field strength exceeds a first threshold.
5. The device of features 2 to 4, wherein the processor is further configured to determine an ambient magnetic field strength by averaging a plurality of magnetic field strength readings over time.
6. The device of feature 5, wherein the processor is configured to ignore magnetic field strength readings over an upper threshold value when determining the ambient magnetic field strength.
7. The device of features 5 or 6, wherein the determination of whether the magnetic field strength satisfies the second criterion comprises determining whether the difference between the magnetic field strength and the ambient magnetic field strength exceeds a threshold.
8. The device of feature 4 to 7, wherein the determination of whether the magnetic field strength exceeds the first threshold comprises determining the distance between the first device and the second device based on the measured magnetic field strength.
9. The device of any of features 2 to 7, wherein the measuring of the magnetic field strength comprises taking multiple measurements over a time period and wherein the determination of whether the magnetic field strength satisfies the second criterion comprises calculating a rate of change of magnetic field over the time period and determining whether the rate of change of magnetic field exceeds a threshold.
10. The device of any of features 2 to 9, wherein the processor is further configured to calibrate the measured magnetic field strength by averaging a plurality of measurements of magnetic field strength over a period of time.
11. The device of any of features 1 to 10, wherein the determining whether the value of the property of the magnetic field satisfies at least a second criterion further comprises:
generating a magnetic field footprint by performing a Fourier transform on the detected magnetic field;
correlating the magnetic field footprint with one or more template footprints; and
verifying a match between the magnetic field footprint and one of the template footprints based on the correlation.
12. The device of feature 11, wherein the correlation is performed using a matched filter.
13. The device of features 11 or 12, wherein the correlation comprises comparing the magnetic field footprint with a conjugated time-reversed version of each of the one or more template footprints.
14. The device of any of features 1 to 13, further comprising a gyroscope, wherein the processor is further configured to:
determine a pitch and/or roll event of the device by monitoring outputs of the gyroscope; and
during determining of that value of the property of magnetic field satisfies the second criteria, ignore magnetic readings satisfying the second criteria during the pitch and/or roll event.
15. The device of any of features 1 to 14, wherein the property is a received signal strength indication (RSSI) and determining whether the value of the property satisfies the first criterion comprises calculating a value of received signal strength.
16. The device of feature 15, the first criterion is that the value of received signal strength exceeds a signal strength threshold.
17. The device of features 15 or 16, wherein the value of the received signal strength is normalised based on a characteristic of the device.
18. The device of feature 17 wherein the characteristic is a make or model of the device.
19. The device of feature 15 to 18, wherein the processor is further configured to low pass filter the calculated value of received signal strength before determining whether the value of the received signal strength exceeds the signal strength threshold.
20. The device of any of features 1 to 19, further comprising an accelerometer.
21. The device of features 20, wherein registration of a touch event is further dependent on a change in acceleration of the first device measured by the accelerometer.
22. The device of feature 21, further wherein the change of acceleration comprises a change in direction of acceleration.
23. The device of feature 20, wherein the processor is further configured to:
determine a pitch and/or roll event of the device by monitoring outputs of the accelerometer; and
during determining of that value of the property of magnetic field satisfies the second criteria, ignore magnetic readings satisfying the second criteria during the pitch and/or roll event.
24. The device of any of features 20 to 23, wherein the registration of a touch event is further dependent on a determination by an accelerometer that the device has been stationary for a predetermined period of time.
25. The device of any of features 20 to 23, wherein the registration of a touch event is further dependent on a determination of a change in acceleration preceding the device being stationary for the predetermined period of time.
26. The device of any of features 1 to 25, wherein the processor is further configured to extract a unique identifier from the received RF signal, the unique identifier identifying the second device.
27. A device according to any of features 1 to 25, wherein the second device is a proximity beacon according to any of features 1 to 7.
28. A method of validating the proximity of a first device from a second device, the method comprising, at the first device:
receiving a RF signal from the second device;
determining a value of a property of the received RF signal;
determining whether the value of the property of the RF signal satisfies a first criterion;
determining a value of a property of the magnetic field at the first device;
determining whether the value of the property of the magnetic field satisfies a second criterion; and
registering a touch event in dependence on determining that the value of the property of the received RF signal satisfies the first criterion and that the value of the property of the magnetic field satisfies the second criterion.
29. The method of feature 28, wherein the property of the magnetic field is magnetic field strength.
30. The method of feature 29, further comprising high pass filtering the detected magnetic field strength.

31. The method of features 28 or 30, wherein the determination of whether the magnetic field strength satisfies the second criterion comprises determining whether the magnetic field strength exceeds a first threshold.
32. The method of any of features 28 to 31, further comprising determining an ambient magnetic field strength by averaging a plurality of magnetic field strength readings at the first device over time.
33. The method of feature 32, further comprising ignoring magnetic field strength readings over an upper threshold value when determining the ambient magnetic field strength.
34. The method of features 32 or 33, wherein the determination of whether the magnetic field strength satisfies the second criterion comprises determining whether the difference between the magnetic field strength and the ambient magnetic field strength exceeds a threshold.
35. The method of any of features 31 to 34, wherein the determination of whether the magnetic field strength exceeds the first threshold comprises determining the distance between the first device and the second device based on the measured magnetic field strength.
36. The method of any of features 29 to 35, wherein the measuring of the magnetic field strength comprises taking multiple measurements over a time period and wherein the determination of whether the magnetic field strength satisfies the second criterion comprises calculating a rate of change of magnetic field over the time period and determining whether the rate of change of magnetic field exceeds a threshold.
37. The method of any of features 29 to 36, further comprising calibrating the measured magnetic field strength by averaging a plurality of measurements of magnetic field strength over a period of time.
38. The method of any of features 28 to 37, wherein the determining whether the value of the property of the magnetic field satisfies at least a second criterion further comprises:
    generating a magnetic field footprint by performing a Fourier transform on the detected magnetic field;
    correlating the magnetic field footprint with one or more template footprints; and
    verifying a match between the magnetic field footprint and one of the template footprints based on the correlation.
39. The method of features 38, wherein the correlation involves comparing the magnetic field footprint with a conjugated time-reversed version of each of the one or more template footprints.
40. The method of any of features 1 to 13, further comprising determining a pitch and/or roll event of the device by monitoring outputs of a gyroscope or accelerometer in the first device; and
    during determining of that value of the property of magnetic field satisfies the second criteria, ignoring magnetic readings satisfying the second criteria during the pitch and/or roll event.
41. The method of any of features 28 to 40, wherein the property of the received RF signal is a received signal strength indication (RSSI).
42. The method of feature 41, wherein the first criterion is that the received signal strength exceeds a signal strength threshold.
43. The method of features 41 or 42, wherein the value of the received signal strength is normalised based on a characteristic of the first device.
44. The method of feature 43 wherein the characteristic is a make or model of the first device.
45. The method of features 41 wherein the calculated value of received signal strength is low pass filtered before determining whether the value of the received signal strength exceeds the signal strength threshold.
46. The method of any of features 28 to 45, wherein registration of a touch event is further dependent on a change in acceleration of the first device or the second device.
47. The method of feature 46, wherein the change of acceleration comprises a change in direction of acceleration.
48. The method of any of features 28 to 47, wherein the registration of a touch event is further dependent on a determination, using an accelerometer, that the first device has been stationary for a predetermined period of time, or wherein the registration of a touch event is dependent on a determination, using an accelerometer, that the second device has been stationary for a predetermined period of time.
49. The method of feature 48, wherein the registration of a touch event is further dependent on a determination using the accelerometer, of a change in acceleration preceding the first device or the second device being stationary for the predetermined period of time.
50. A method of registering a touch event in which a first device is brought within a threshold distance from a second device, the method comprising:
    receiving, at the first device, a RF signal from the second device;
    calculating a value of property of the received RF signal;
    determining whether the value of the property of the RF signal satisfies a first criterion;
    monitoring for a change in acceleration of the first device or the second device; and
    registering a touch event in dependence on determining that the value of the property satisfies a first criterion and detecting the change in acceleration.
51. A device, comprising:
    means for receiving an RF signal;
    means for determining a value of a property of the received RF signal;
    means for determining whether the value of the property of the RF signal satisfies a first criterion;
    means for determining a value of a property of the magnetic field at the device;
    means for determining whether the value of the property of the magnetic field satisfies a second criterion; and
    means for registering a touch on determining that the value of the property of the received RF signal satisfies the first criterion and the value of the property of the magnetic field satisfies the second criterion.
52. The device of feature 51, wherein the property of the magnetic field is magnetic field strength.
53. A system for registering a touch event in which a first device is brought within a threshold distance of a second device, the system comprising:
    a first device;
    a second device;
    circuitry arranged to determine a first distance between the first device and the second device and to determine that the first distance is less than the threshold distance;
    circuitry arranged to validate the touch event.
54. The system of feature 53, wherein the circuitry arranged to determine the distance between the first device and the second device comprises circuitry arranged to communicate between the first device and the second device over a radio-frequency (RF) channel and for determining that the distance is less than the threshold distance.

55. The system of feature 54, wherein the circuitry arranged to communicate between the first device and the second device comprises a RF transmitter disposed in either of the first device and the second device and a RF receiver disposed in other of the first device and the second device.

56. The system of feature 55, wherein the RF transmitter and RF receiver are configured to transmit using a Bluetooth or WiFi communication protocol.

57. The system of feature 56, wherein the RF transmitter is an iBeacon.

58. The system of feature 53, wherein the circuitry arranged to determine the distance between the first device and the second device comprises one or more global positioning system (GPS) modules for locating the first device relative to the second device.

59. The system of any of features 53 to 58, wherein the circuitry arranged to validate the touch event comprises one or more sensors configured to detect a change in external conditions of the first device or the second device.

60. The system of feature 59, wherein the change in external conditions is a change in magnetic field around the first device or the second device.

61. The system of feature 60, wherein the circuitry arranged to validate the touch event comprises a magnet disposed in either of the first device and the second device and a magnetometer disposed in other of the first device and the second device, the validation comprising determining a second distance between the first and second device in dependence of a value of a property the magnetic field registered by the magnetometer and determining that the second distance is less than the threshold distance.

62. The system of feature 61, wherein the property of the magnetic field is magnetic field strength.

63. The system of features 61 or 62, wherein the second distance is less than the first distance.

64. The system of feature 60, wherein the circuitry arranged to validate the touch event comprises a magnet disposed in either of the first device and the second device and a magnetometer disposed in other of the first device and the second device, the validation comprising calculating a rate of change of magnetic field registered by the magnetometer and determining that the rate of change exceeds a threshold.

65. The system of feature 60, wherein the change in external conditions is a change in acceleration of the first device or the second device.

66. The system of feature 65, wherein the change in acceleration of the first device of the second device comprises a change in direction of acceleration.

67. The system of features 65 or 66, wherein the circuitry arranged to validate the touch event comprises an accelerometer disposed in the first device or the second device.

68. The system of feature 65, wherein the touch event is validated when the accelerometer registers a sudden change in acceleration or wherein the touch event is validated when the accelerometer registers a period substantially zero acceleration.

69. A proximity beacon, comprising:
a radio-frequency (RF) transmitter arranged to generate a RF signal to be received by a second device; and
a magnet configured to generate a magnetic field for interaction with a magnetometer of a second device.

70. A device for registering a touch event validating the proximity of the device with a second device, the device comprising:
a radio-frequency (RF) receiver configured to receive an RF signal from the second device;
a magnetometer configured to detect a magnetic field generated by the second device;
a processor configured to:
determine a first touch event confidence rating in dependence on a property of the received RF signal;
determine a second touch event confidence rating in dependence on a property of the detected magnetic field; and
register the touch event in dependence on the first and second touch event confidence ratings.

71. The device of feature 70, wherein the property of the magnetic field is magnetic field strength.

72. The device of features 70 or 71, wherein the property of the RF signal is received signal strength.

73. The device of any of features 70 to 72, wherein registering the touch event comprises:
summing the first and second touch event confidence ratings; and
registering the touch event of the summed touch event confidence rating exceeds a threshold confidence rating.

74. The device of any of features 70 to 73 further comprising an accelerometer or a gyroscope configured to detect an amount of tilt experienced by the device, the processor further configured to:
determine a third touch event confidence rating in dependence on the measured amount of tilt of the device; and
register the touch event in dependence on the first, second and third touch event confidence ratings.

75. The device of feature 74, wherein registering the touch event comprises:
summing the first, second and third touch event confidence ratings; and
registering the touch event of the summed touch event confidence rating exceeds a threshold confidence rating.

76. A method of registering a touch event to validate the proximity of a first device from a second device, the method comprising, at the first device:
receiving an RF signal from the second device;
detecting a magnetic field generated by the second device;
determining a first touch event confidence rating in dependence on a property of the received RF signal;
determining a second touch event confidence rating in dependence on a property of the detected magnetic field; and
registering the touch event in dependence on the first and second touch event confidence ratings.

77. The method of feature 76, wherein the property of the magnetic field is magnetic field strength.

78. The method of features 76 or 77, wherein the property of the RF signal is received signal strength.

79. The method of any of features 76 to 78, wherein registering the touch event comprises:
summing the first and second touch event confidence ratings; and
registering the touch event of the summed touch event confidence rating exceeds a threshold confidence rating.

80. The method of any of features 76 to 79 further comprising:
detecting an amount of tilt experienced by the device;

determining a third touch event confidence rating in dependence on the measured amount of tilt of the device; and registering the touch event in dependence on the first, second and third touch event confidence ratings.

81. The method of feature 80, wherein registering the touch event comprises:
summing the first, second and third touch event confidence ratings; and
registering the touch event of the summed touch event confidence rating exceeds a threshold confidence rating.

82. A device as herein described with reference to the accompanying drawings.

The invention claimed is:

1. A first device, comprising:
a radio-frequency (RF) receiver configured to receive an RF signal from a second device;
a magnetometer configured to detect a magnetic field generated by the second device;
a processor configured to:
a) determine a value of a property of a received RF signal, and
determine whether the value of the property of the RF signal satisfies at least a first criterion;
b) determine a value of a property of the magnetic field at the first device, and
determine whether the value of the property of the magnetic field satisfies at least a second criterion; and
c) register a touch event on determining that the value of the property of the received RF signal satisfies the first criterion and that the value of the property of the magnetic field satisfies the second criterion,
wherein the processor is further configured to run processes a) and b) concurrently.

2. The first device of claim 1, wherein the property of the magnetic field is magnetic field strength and wherein the processor is further configured to high pass filter the detected magnetic field.

3. The first device of claim 2, wherein the determination of whether the magnetic field strength satisfies the second criterion comprises determining whether the magnetic field strength exceeds a first threshold.

4. The first device of claim 3, wherein the determination of whether the magnetic field strength exceeds the first threshold comprises determining the distance between the first device and the second device based on the determined magnetic field strength.

5. The first device of claim 2, wherein the processor is further configured to determine an ambient magnetic field strength by averaging a plurality of magnetic field strength readings over time and wherein the processor is configured to ignore magnetic field strength readings over an upper threshold value when determining the ambient magnetic field strength.

6. The first device of claim 5, wherein the determination of whether the magnetic field strength satisfies the second criterion comprises determining whether the difference between the magnetic field strength and the ambient magnetic field strength exceeds a threshold.

7. The first device of claim 2, wherein the determining of the magnetic field strength comprises taking multiple measurements over a time period and wherein the determination of whether the magnetic field strength satisfies the second criterion comprises calculating a rate of change of magnetic field over the time period and determining whether the rate of change of magnetic field exceeds a threshold.

8. The first device of claim 2, wherein the processor is further configured to calibrate the determined magnetic field strength by averaging a plurality of measurements of magnetic field strength over a period of time.

9. The first device of claim 1, wherein the determining whether the value of the property of the magnetic field satisfies at least a second criterion further comprises:
generating a magnetic field footprint by performing a Fourier transform on the detected magnetic field;
correlating the magnetic field footprint with one or more template footprints; and
verifying a match between the magnetic field footprint and one of the template footprints based on the correlation,
wherein the correlation comprises comparing the magnetic field footprint with a conjugated time-reversed version of each of the one or more template footprints.

10. The first device of claim 1, wherein the property is a received signal strength indication (RSSI) and determining whether the value of the property satisfies the first criterion comprises calculating a value of received signal strength and determining whether the value of received signal strength exceeds a signal strength threshold, wherein the value of the received signal strength is normalised based on a characteristic of the device.

11. A method of validating the proximity of a first device from a second device, the method comprising, at the first device:
a) receiving a RF signal from the second device,
determining a value of a property of the received RF signal, and
determining whether the value of the property of the RF signal satisfies a first criterion;
b) determining a value of a property of a magnetic field at the first device, and
determining whether the value of the property of the magnetic field satisfies a second criterion; and
c) registering a touch event in dependence on determining that the value of the property of the received RF signal satisfies the first criterion and that the value of the property of the magnetic field satisfies the second criterion,
wherein method steps a) and b) are performed concurrently.

12. The method of claim 11, wherein the property of the magnetic field is magnetic field strength, and the method further comprising high pass filtering the detected magnetic field strength.

13. The method of claim 12, wherein the determination of whether the magnetic field strength satisfies the second criterion comprises determining whether the magnetic field strength exceeds a first threshold.

14. The method of claim 13, wherein the determination of whether the magnetic field strength exceeds the first threshold comprises determining the distance between the first device and the second device based on the determined magnetic field strength.

15. The method of claim 12, further comprising determining an ambient magnetic field strength by averaging a plurality of magnetic field strength readings at the first device over time and ignoring magnetic field strength readings over an upper threshold value when determining the ambient magnetic field strength.

16. The method of claim 15, wherein the determination of whether the magnetic field strength satisfies the second criterion comprises determining whether the difference between the magnetic field strength and the ambient magnetic field strength exceeds a threshold.

17. The method of claim 12, wherein the determining of the magnetic field strength comprises taking multiple measurements over a time period and wherein the determination of whether the magnetic field strength satisfies the second criterion comprises calculating a rate of change of magnetic field over the time period and determining whether the rate of change of magnetic field exceeds a threshold.

18. The method of claim 12, further comprising calibrating the determined magnetic field strength by averaging a plurality of measurements of magnetic field strength over a period of time.

19. The method of claim 11, wherein the property of the received RF signal is a received signal strength indication (RSSI), the first criterion is that the received signal strength exceeds a signal strength threshold and the value of the received signal strength is normalised based on a characteristic of the first device.

20. A system for registering a touch event in which a first device is brought within a threshold distance of a second device, the system comprising:

a first device;

a second device;

circuitry arranged to determine a first distance between the first device and the second device and to determine that the first distance is less than the threshold distance; and circuitry arranged to validate the touch event, wherein the circuitry arranged to determine the distance between the first device and the second device comprises circuitry arranged to communicate between the first device and the second device over a radio-frequency (RF) channel and for determining that the distance is less than the threshold distance, wherein the circuitry arranged to validate the touch event comprises one or more sensors configured to detect a change in magnetic field around the first or second device, and wherein the circuitry arranged to determine a first distance and the circuitry arranged to validate the touch event run concurrently.

\* \* \* \* \*